US008861066B2

(12) United States Patent
Askebjer et al.

(10) Patent No.: US 8,861,066 B2
(45) Date of Patent: Oct. 14, 2014

(54) OVERSIZED MICRO-MECHANICAL LIGHT MODULATOR WITH REDUNDANT ELEMENTS, DEVICE AND METHOD

(75) Inventors: Per Askebjer, Åkersberga (SE); Torbjörn Sandström, Pixbo (SE)

(73) Assignee: Micronic AB, Taby (SE)

( * ) Notice: Subject to any disclaimer, the term of this patent is extended or adjusted under 35 U.S.C. 154(b) by 779 days.

(21) Appl. No.: 12/706,612

(22) Filed: Feb. 16, 2010

(65) Prior Publication Data
US 2010/0225992 A1    Sep. 9, 2010

Related U.S. Application Data

(60) Provisional application No. 61/152,950, filed on Feb. 16, 2009, provisional application No. 61/152,955, filed on Feb. 16, 2009.

(51) Int. Cl.
*G02B 26/00* (2006.01)
*G02F 1/03* (2006.01)
*G02F 1/07* (2006.01)
*B41J 2/47* (2006.01)
*G02B 26/08* (2006.01)

(52) U.S. Cl.
CPC .................................. *G02B 26/0833* (2013.01)
USPC ............................. 359/291; 359/246; 347/239

(58) Field of Classification Search
USPC ......... 359/290–292, 295, 298, 237, 245–247, 359/239–242; 362/623; 348/770–772; 347/239, 241, 247, 255, 256
See application file for complete search history.

(56) References Cited

U.S. PATENT DOCUMENTS

| 5,132,723 A | 7/1992 | Gelbart |
| 5,815,303 A * | 9/1998 | Berlin .......................... 359/196.1 |
| 5,982,553 A | 11/1999 | Bloom et al. |

(Continued)

FOREIGN PATENT DOCUMENTS

| EP | 0687962 A2 | 12/1995 |
| EP | 0692728 A2 | 1/1996 |
| EP | 1155865 A2 | 11/2001 |
| WO | 03079090 A1 | 9/2003 |

OTHER PUBLICATIONS

International Search Report of International Search Authority, Appl. No. PCT/EP2010/051939, mailed Jun. 8, 2010, pp. 1-4.

(Continued)

*Primary Examiner* — Thomas K Pham
*Assistant Examiner* — Brandi Thomas
(74) *Attorney, Agent, or Firm* — Haynes Beffel & Wolfeld LLP; Ernest J. Beffel, Jr.

(57) ABSTRACT

The present invention relates to a reconfigurable micro-mechanical light modulator including a two-dimensional array of modulating elements with redundant rows of modulating elements. In particular, it relates to extending the life of the modulator by shifting the set of elements used, without physically replacing the micro-mechanical light modulator. The modulating elements are adapted to modulate light impinging on the micro-mechanical light modulator. The array of modulating elements comprises a first and a second set of modulating elements. The second set is a redundant set of modulating elements that can be selected to substitute for the first set of modulating elements in modulating light impinging on the micro-mechanical light modulator, without physically replacing the micro-mechanical light modulator. Devices and methods are described.

16 Claims, 17 Drawing Sheets

(56) References Cited

U.S. PATENT DOCUMENTS

| | | |
|---|---|---|
| 6,806,897 B2 | 10/2004 | Kataoka et al. |
| 6,813,062 B2 | 11/2004 | Sandstrom |
| 6,891,655 B2 | 5/2005 | Grebinski et al. |
| 6,987,599 B2 | 1/2006 | Sandstrom |
| 7,023,606 B2 | 4/2006 | Huibers |
| 7,061,351 B2 | 6/2006 | Suzuki et al. |
| 7,158,280 B2 | 1/2007 | Sandstrom |
| 7,196,740 B2 | 3/2007 | Huibers |
| 7,268,935 B2 | 9/2007 | Roberts |
| 7,362,493 B2 | 4/2008 | Huibers et al. |
| 7,365,901 B2 | 4/2008 | Sandstrom |
| 2002/0122237 A1 | 9/2002 | Sandstrom et al. |
| 2005/0094246 A1 | 5/2005 | Roberts |
| 2006/0067652 A1* | 3/2006 | Cummings et al. ........... 385/147 |
| 2006/0181758 A1 | 8/2006 | Willis |
| 2010/0208329 A1 | 8/2010 | Sandstrom et al. |

OTHER PUBLICATIONS

Vern Shrauger et al, "Development of a high-speed, high-fill-factor phase-only spatial light modulator", Proceedings of SPIE, vol. 4291, Apr. 2001, pp. 101-108.

International Search Report & Written Opinion of the International Searching Authority, Appl. No. PCT/EP2010/051936, mailed Jun. 8, 2010.

International Preliminary Report on Patentabililty of the International Searching Authority, Appl. No. PCT/EP2010/051936, mailed Jun. 29, 2011, pp. 1-13.

* cited by examiner

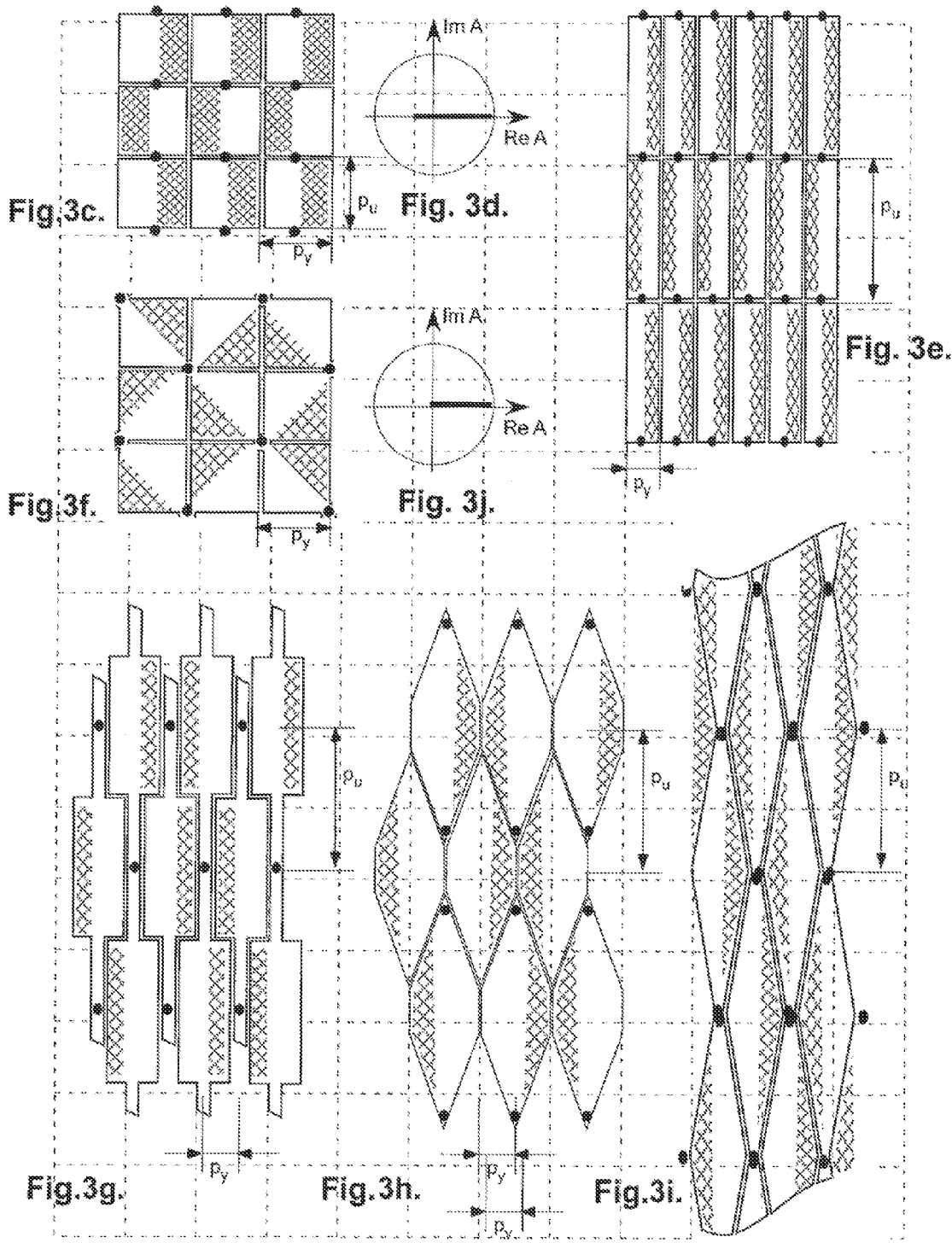

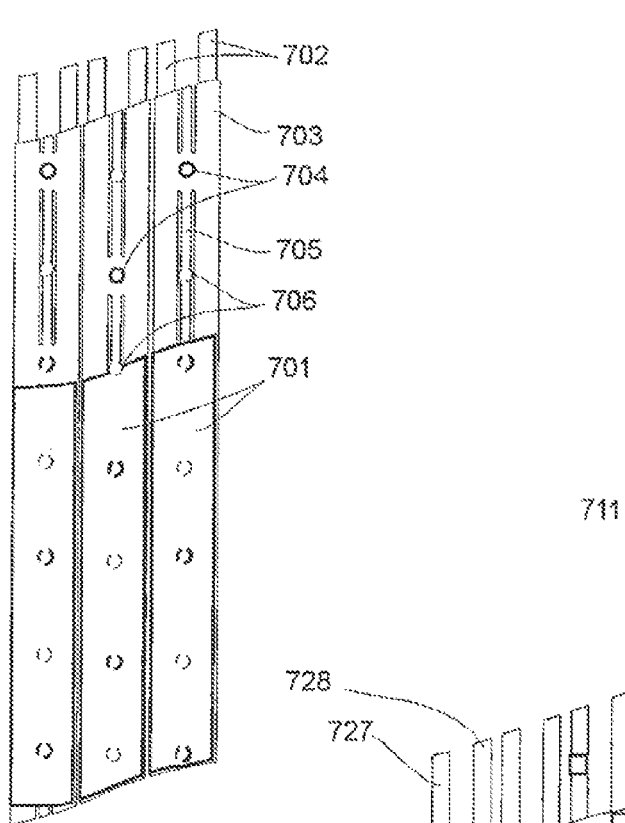
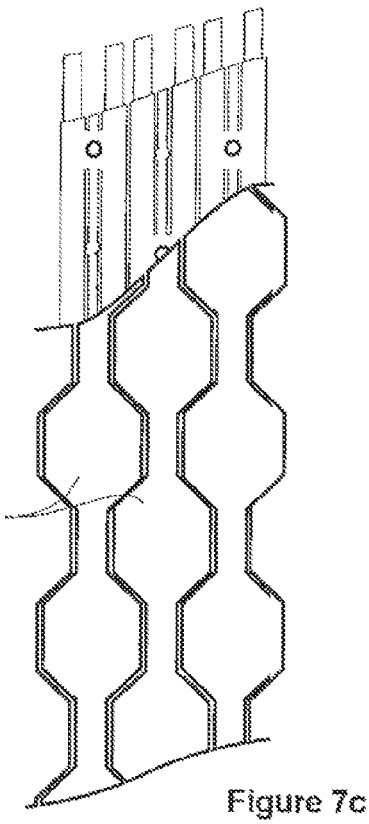
Figure 7b
Figure 7c
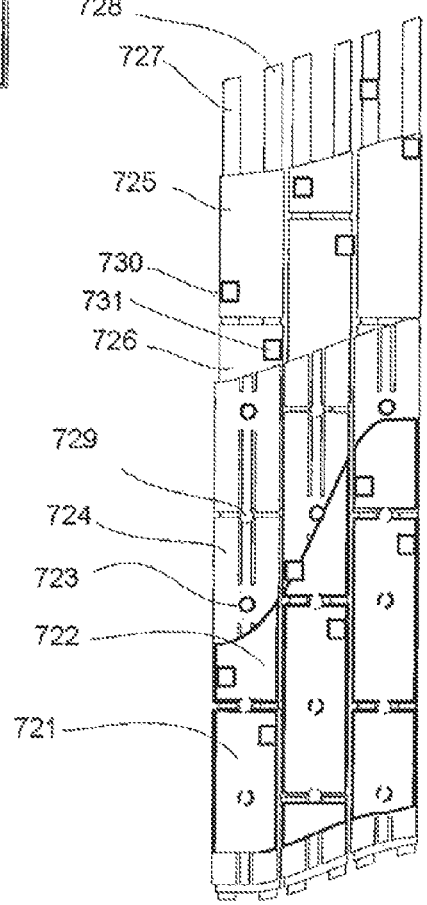
Figure 7d

OVERSIZED MICRO-MECHANICAL LIGHT MODULATOR WITH REDUNDANT ELEMENTS, DEVICE AND METHOD

RELATED APPLICATION

This application claims the benefit of U.S. Provisional Application Nos. 61/152,950 and 61/152,955, filed 16 Feb. 2009, which are hereby incorporated by reference.

BACKGROUND OF THE INVENTION

This document describes SLMs having improved image quality, modulation speed, and power handling. The improved SLMs are useful in lithographic writers and other patterning applications. An SLM with high speed and high power handling gives a lower system cost since a single SLM can replace several SLMs as known in the art. The highest known throughput in prior 1D SLMs is 2 billion gray-scale pixels per second. The technology disclosed enables SLMs with a throughput of 20-30 billion pixels per second.

What we call one-dimensional SLMs have been used for computer displays and for lithography. By "one-dimensional SLM" we mean a single row of controllable elements, such as in early versions of Texas Instruments' "digital light processor" or DLP, which is used in projectors, televisions and other applications. Another example of a one-dimensional SLM is the grating light valve or GLV devices from Silicon Light Machines.

SLMs of various configurations have been produced by Texas Instruments and Xerox (1D deformable mirror arrays for xerographic printers), Silicon Light Machines (Grating Light Valve, or GLV, displays photo setting and lithography), Samsung (Spatial Optical Modulator, or SOM, for laser displays), KODAK (Grating Electro-Mechanical System, or GEMS, for laser displays) and Micronic Laser Systems (lithography). It is worth noting that 1D and 2D SLMs are not replacements for each other, but are used in different architectures. In particular, they are illuminated with different types of light sources. A 1D SLM is typically used in a scanning mode with continuous or quasi-continuous (high-frequency pulsing e.g. mode-locked) light sources, while 2D SLMs use a low-frequency pulsed laser (e.g. an excimer laser) to realize the full inherent data rate of the 2D array.

An opportunity arises to improve on SLM design in ways that potentially improve operating spread, reduce surface damage to mirrors, permit switching array banks of elements without replacing the SLM, and/or extending the life of an SLM.

SUMMARY OF THE INVENTION

The present invention relates to a reconfigurable micro-mechanical light modulator including a two-dimensional array of modulating elements with redundant rows of modulating elements. In particular, it relates to extending the life of the modulator by shifting the set of elements used, without physically replacing the micro-mechanical light modulator. The modulating elements are adapted to modulate light impinging on the micro-mechanical light modulator. The array of modulating elements comprises a first and a second set of modulating elements. The second set is a redundant set of modulating elements that can be selected to substitute for the first set of modulating elements in modulating light impinging on the micro-mechanical light modulator, without physically replacing the micro-mechanical light modulator. Devices and methods are described.

BRIEF DESCRIPTION OF THE DRAWINGS

FIG. 3c shows how an array of tilting mirrors may tilt to different sides to avoid asymmetry.

FIG. 3d graphs amplitude reflection coefficients in the range −0.2+0.0 j to 1.0+0.0 j.

FIG. 3e shows elongated mirrors with a shorter pitch distance.

FIG. 3f graphs amplitude reflection coefficients of mirrors tilting over the diagonal, which is close 0.0+0.0 j to 1.0+0.0 j.

FIGS. 3g, h and i show pixel layouts which have a short pitch, without relying on the narrow mirrors of FIG. 3e.

FIG. 7b shows individual elements connected to form long tilting lines. Posts and springs are distributed along the line to raise the resonance frequency and improve flatness. The picture also shows a hidden yoke and hidden hinges.

FIG. 7c is similar to FIG. 7b but the lines are contoured for a different amplitude trajectory when the mirror tilts.

FIG. 7d shows piston mirrors. Mirrors in one column are operated collectively, but with a phase difference between at least some adjacent mirror elements which determine if the pixel in the image plane is bright, dark or something in between. Operating collectively may include moving some pistons up and others down to create reflected phase differences between adjoining reflecting surfaces. Or, approximately half of the reflecting surfaces may be fixed and the other half movable.

Figure 11:
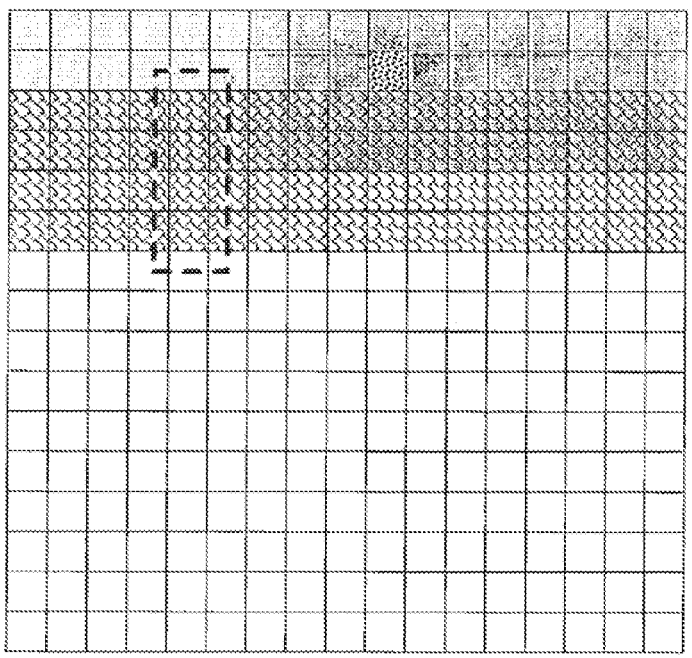

The banks of elements may overlap, as shown in FIG. 11.

Figure 12:
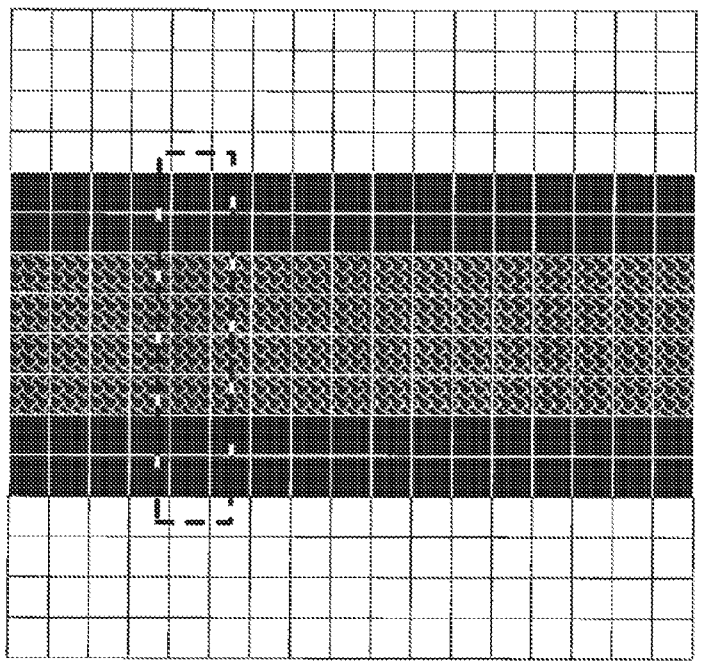

In FIG. 12, four elements initially functioned together. In the expanded configuration, eight elements functioned together.

DETAILED DESCRIPTION

The following detailed description is made with reference to the figures. Preferred embodiments are described to illustrate the technology disclosed, not to limit the scope of protection, which is defined by the claims. Those of ordinary skill in the art will recognize a variety of equivalent variations on the description that follows.

Introduction and Overview

Spatial light modulators ("SLMs") are micro-mirror devices that use tilting mirrors, piston elements or elements with another action, e.g. internal deformation to modulate light that is projected from the SLM at an object plane onto a workpiece at an image plane. Given the data rate and laser pulse rate for lasers used with SLMs, it is desirable for an SLM to have a useful lifetime on the order of $10^{13}$ mechanical cycles, or more, and $10^{16}$ laser pulses, or more, for mode locked lasers.

SLMs relay repeated laser bursts. At least for high energy laser bursts, the individual elements of the SLMs typically suffer surface damage, as described in U.S. Pat. No. 6,891,655, "High energy, low energy density, radiation-resistant optics used with micro-electromechanical devices." In the past, surface coatings and silicon-based mirror structures have been described to extend the life of mirrors in SLMs, by reducing surface damage.

We disclosure two new life-extending approaches. First, multiple mirrors can be combined to produce a collective element that has a larger reflective area and can deliver the desired power density at the image plane with a lower power density at the object plane, where the SLM is positioned. Lower power densities are expected to reduce surface damage. Multiple mirrors that collectively form a reflective area can, optionally, be designed to cycle more quickly, because of the relatively small size of a single mirror.

Second, an oversized micro-mechanical modulator with redundant rows of elements is disclosed. As some elements fail, the overall array is repositioned relative to the optical path and redundant rows take over. The repositioning can be implemented by moving the modulator or by altering the optical path.

Primary Focus and Broad Application

While the primary focus of this application is analog voltage tilting-mirror SLMs, the technology described also can be applied to other configurations of micro-mechanical light modulators, including deformable micro-mirror devices (DMDs), such as those produced by Texas Instruments, and grating light valves (GLVs), such as those produced by Sony-Silicon Light Machines. It further can be applied to piston devices, in which elements move up and down, producing diffraction effects between adjoining piston elements, and to devices with combinations of tilt and piston movement or with multiple areas per pixel or deformation of the mirror.

The primary focus of the application is micro-mirrors that function in a diffraction mode that relies on interference between portions of relayed radiation to control intensity at the image plane. That is, at one tilt angle, the micro-mirrors reflect with their greatest intensity and at another angle, diffraction effects between micro-mirror elements or across the face of a single element greatly reduce or substantially extinguish the intensity of light relayed along the so-called zeroth diffraction order. The light illuminating the micro-mirrors is scattered by diffraction across the first and higher orders of diffraction angles. The optical apparatus directs the zeroth order reflection, or optionally some other order, onto the image plane. A device of this sort can be used to produce binary intensities of projected radiation or grey scaled intensities, as described in prior applications assigned to Micronic Laser Systems and others.

The technology described can also be applied to other devices such as GLVs and piston devices that utilize diffraction effects. Or, it can be applied to DMDs or other devices that deflect the zeroth order radiation out of the image field to produce a binary illumination. That is, it also applies to DMD and similar devices that steer illumination either at the image plane or deflect it out of the image plane.

Collective Elements

One environment in which the new approach is particularly useful employs an n×m array of micro-mirrors operating as a 1×m device. A group of mirrors, for instance four mirrors in the same row in the u direction (FIG. 1) perform as a single element. Use of multiple mirror elements as a single unit increases the speed at which the mirrors can be modulated, because it reduces the mass of any single mirror. Other physical characteristics of the mirrors are also scaled down when multiple mirrors are used to produce a single image unit. It also relatively reduces the energy density required on any one mirror, by increasing the reflecting surface. When energy density is reduced, surface damage also is reduced. The multiple mirror elements have multiple posts and multiple flexure springs which give to the collective element optical flatness and a high resonance frequency, e.g. 500 KHz, 1 MHz or 2 MHz. The shape of the mirror elements is rather flexible. They can be square, rhombic, hexagonal, and many other shapes. They may also be mechanically connected, e.g. they may have a connecting link or they may not be separated from each other.

In some embodiments, multiple elements perform as a single unit and are addressed at a single address, reducing the processing required to manipulate the elements. This potentially causes problems with calibration of the multiple adjacent elements, when used in a diffraction mode, because they have slightly varying physical characteristics. Much work has been devoted to calibration of micro-mirrors in SLMs, to improve CD performance by reducing the impact of the varying physical characteristics of individual mirrors. See e.g. U.S. Pat. Nos. 7,158,280, 7,061,351, 6,813,062 and references cited therein. The emphasis on careful calibration of individual mirrors generally teaches away from addressing groups of elements at a single address. Against this teaching away, inventor and his colleagues have concluded that there are some applications in which the error budget can accept addressing or actuating of multiple elements as a single unit and driving the multiple elements with a single signal, such as a voltage applied by a digital-to-analog converter (DAC) to at least one electrode.

Figure 1A:
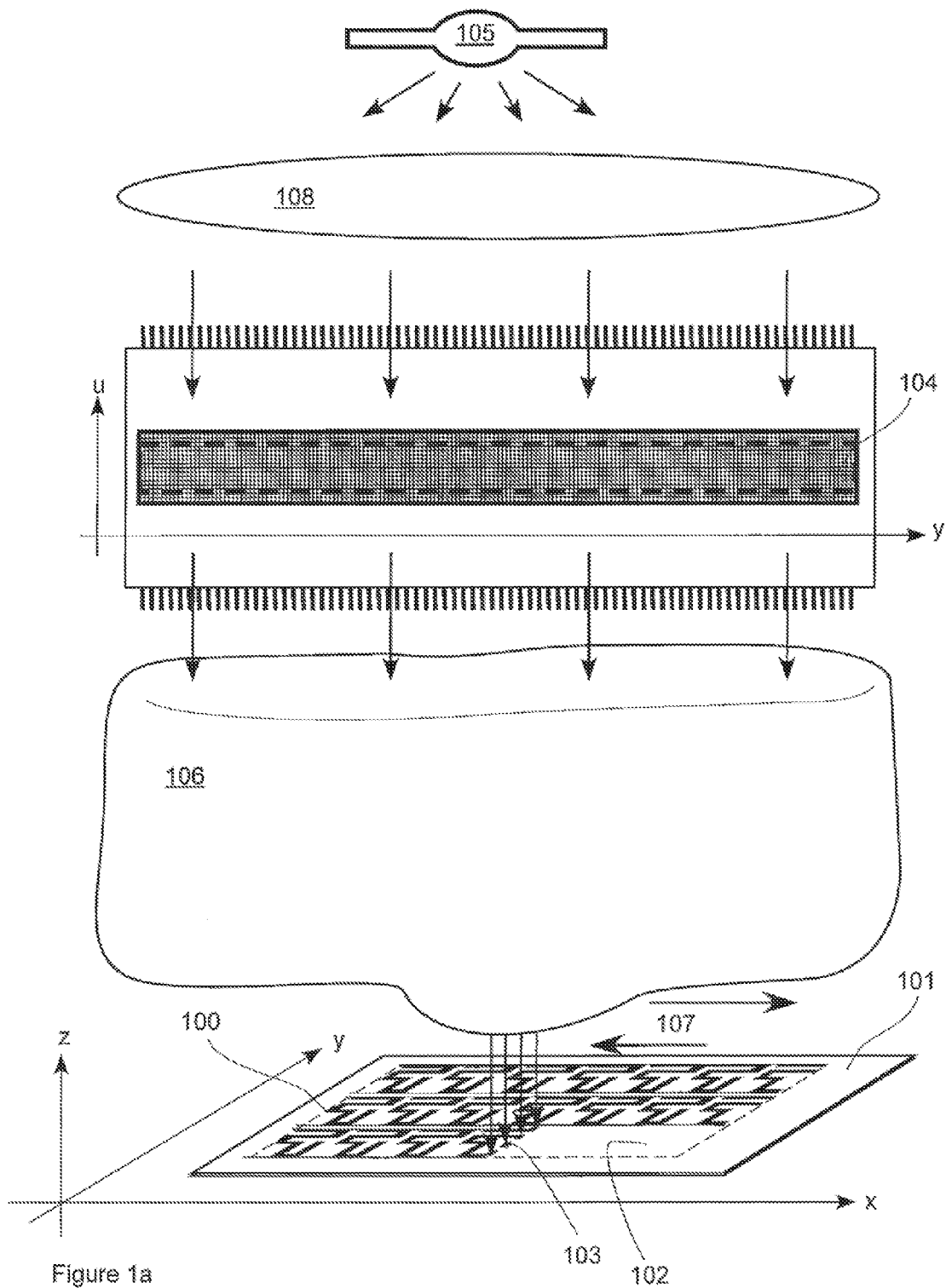
FIG. 1a shows a generic writer or printer using a one-dimensional SLM disclosed and defines the x, y and u coordinates. In these coordinate systems, the direction perpendicular to y is u on the SLM and x in the image plane.

FIG. 1a shows a generic writer or printer using a one-dimensional SLM as disclosed. A light source 105 (arc lamp, gas discharge, laser, array of lasers, laser plasma, LED, array of LEDs etc.) illuminates a one-dimensional SLM 104. The reflected (or transmitted in the general case) radiation is projected as a line segment 103 on a workpiece 101. The data driving the SLM changes as the workpiece is scanned 107 to build up an exposed image. A strongly anamorphic optical system 106 concentrates energy from multiple mirrors in a column (or row) to point in the image and the entire two-dimensional illuminated array forms a narrow line segment 103 that is swept across the workpiece. In one dimension, the anamorphic optics demagnify the illuminated area, for instance, by 2× to 5×, so the a 60 millimeter wide SLM would image onto a line segment 30 to 12 mm long. Along the short dimension, the anamorphic optics strongly demagnify the column of mirrors to focus onto a narrow area such as 3 microns wide, i.e. essentially a single resolved line. Alternatively, the area could be 1 or 5 microns wide or less than 10 microns wide. Focus onto a 3 micron wide area could involve an 80× demagnification, from approximately 240 microns to 3 microns. The anamorphic optical path demagnifies the row of mirrors to an extent that individual mirrors are combined and not resolved at the image plane.

Figure 1B:
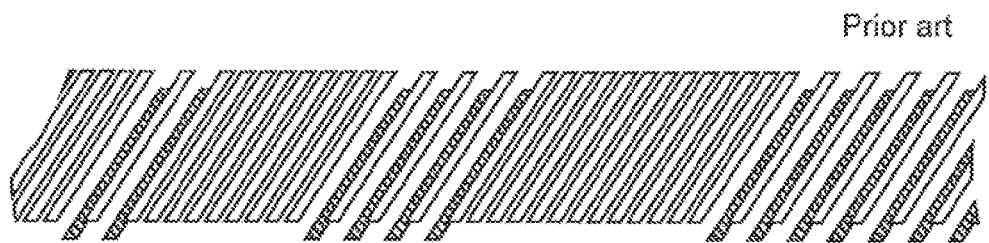
FIGS. 1b and 1c show Silicon Light Machines' GLV and Micronic's two-dimensional SLM.
Figure 1C:
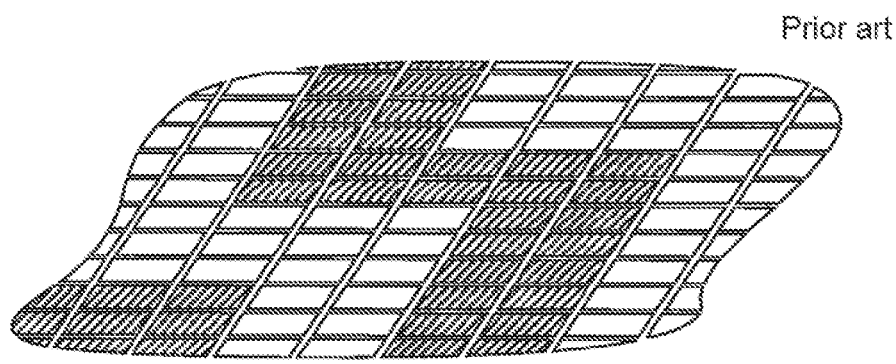

FIGS. 1b and 1c show prior art (Silicon Light Machines' GLV and Micronic's two-dimensional SLM). These configurations are in the patent literature. See, e.g., U.S. Pat. Nos. 7,365,901, 7,158,280, 6,806,897, and 5,982,553.

Figure 1D:
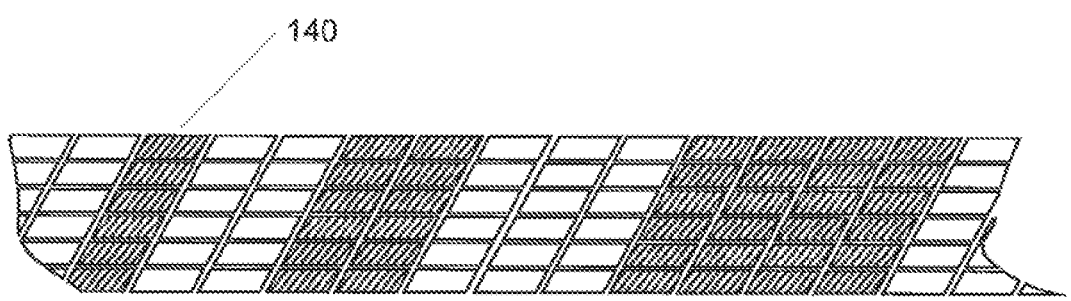
FIG. 1d depicts using a two-dimensional SLM used to create a one-dimensional image.

FIG. 1d shows the two-dimensional SLM used to create a one-dimensional sweeping brush. Using a conventional two-dimensional SLM to produce a one-dimensional sweeping pattern would involve addressing each of the individual mirrors that collectively make up an area. For instance, the column 140 at the left edge of the figure includes five individual mirrors. In a conventional two-dimensional SLM, each of the individual mirrors has its own calibration and receives a separate, individualized control signal. For five individual mirrors, this involves roughly five times as much data traffic as if the collective group of mirrors were addressed as a single unit.

The problem of building a spatial light modulator with high power handling, high modulation speed, and long life-time is solved by using a two-dimensional array of mirrors like in FIG. 1d with the optics of FIG. 1a instead of using the previously known SLM in FIG. 1b. Alternatively, the optics of FIG. 8b may be used. Some embodiments of the SLM disclosed enjoy the following advantages:

First of all it can sustain much higher optical power, since there are no mechanical limitations to the surface area of one pixel. The array of mirrors, or generally light modulators, can be made arbitrarily wide where the width is divided into pixels or segments. The size limitation that is eventually reached is that, at least for partially coherent illumination, the entire pixel needs to be optically flat. By optically flat, we mean bending under force less than 5 nm from perfectly flat or at least bending less than 10 nm. With a device made from a normal silicon wafer and glued onto a cooling plate we have estimated the practical limit to be 400 microns, but with the MEMS formed on a thicker substrate or with a more developed mounting the width of the illuminated area may be larger, e.g. approximately 1 mm, 3 mm, 10 mm or 25 mm, or wider. With a device 80 mm long and 25 mm wide the area is 2000 mm$^2$ and the optical power it can withstand may be larger than 50 W, 100 W or even 500 W depending on the reflectivity and cooling of the mirrors. Very high power may be advantageous for exposure of photoresist at very high speed, e.g. 1 m$^2$/s (300 W, 30 mJ/cm$^2$), for exposure of less sensitive materials such as light-sensitive polyimide or color filter resist, for thermal treatment of a workpiece, or for direct laser ablation.

Secondly, the optical flatness itself is easier to maintain across many individually supported mirrors than with one row of elements. We have found that the optical flatness from mirror to mirror can be controlled well with mirrors which are 5-30 microns and that the dominating flatness error is the flatness of the substrate. That is, bending, warping or irregularity of the substrate may be more critical to satisfying a flatness criteria for maximum bend than the behavior of individual pixels, where the individual pixels are stiff enough. If needed, the substrate may be made flat in a band 25 mm wide or even wider.

Third, using many small mechanical elements instead of a single row of ribbons like in FIG. 1b gives more freedom to choose the type of optical modulation and mechanical actuation. In particular, the mirrors can have tilting action, piston movement, or a combination.

Fourth, smaller mirrors have higher resonance frequency and can operate at a higher pixel rate. By high resonance frequency, we mean higher than 500 KHz or than 1 MHz or than 2 MHz, depending on the application. In particular, tilting mirrors can be made to operate faster than the ribbons in previously known one-dimensional devices of the type shown in FIG. 1b. In the GLV the ribbons are pulled towards the substrate against the spring of the ribbon itself. There is a relation between voltage, maximum travel and speed. Higher voltage and short travel allows a harder spring and gives a higher resonance frequency. The maximum travel needed is given by the wavelength of the modulated light. When the voltage and the wavelength are set the speed can be calculated. Raising the voltage gives faster actuation, but fast analog electronics is not compatible with high voltages. With tilting mirrors, there are several ways to make the mirrors faster, in particular the use of a high DC bias voltage between mirror and substrate. An example: with a voltage swing of 10 volts the ribbon can be actuated from 0 to 10 volts. The force is proportional to the voltage squared, i.e. from 0 to 100 V$^2$. A tilting mirror can be biased by 40 V, +40V on one side and −40 on the other. If the mirror's potential is driven from 0 V to +10 V the force goes from $(40^2-40^2)=0$ to $(50^2-30^2)=1600$ V$^2$, i.e. 16 times higher. The spring can be made 16 times more stiff and the resonance frequency will rise by four times. Unlike prior art Samsung SOM and SLM GLV, which have low resonance frequencies for large areas, small reflecting surfaces working collectively can produce large area and still have a high resonance frequency. Currently, small mirrors typically fit within a rectangle of 28 by 14 microns.

Fifth, since the array may be wider than the illuminated area, it is easy to implement redundant areas in order to prolong the lifetime and/or provide emergency areas in case of a failure, as will be discussed later.

Figure 2:
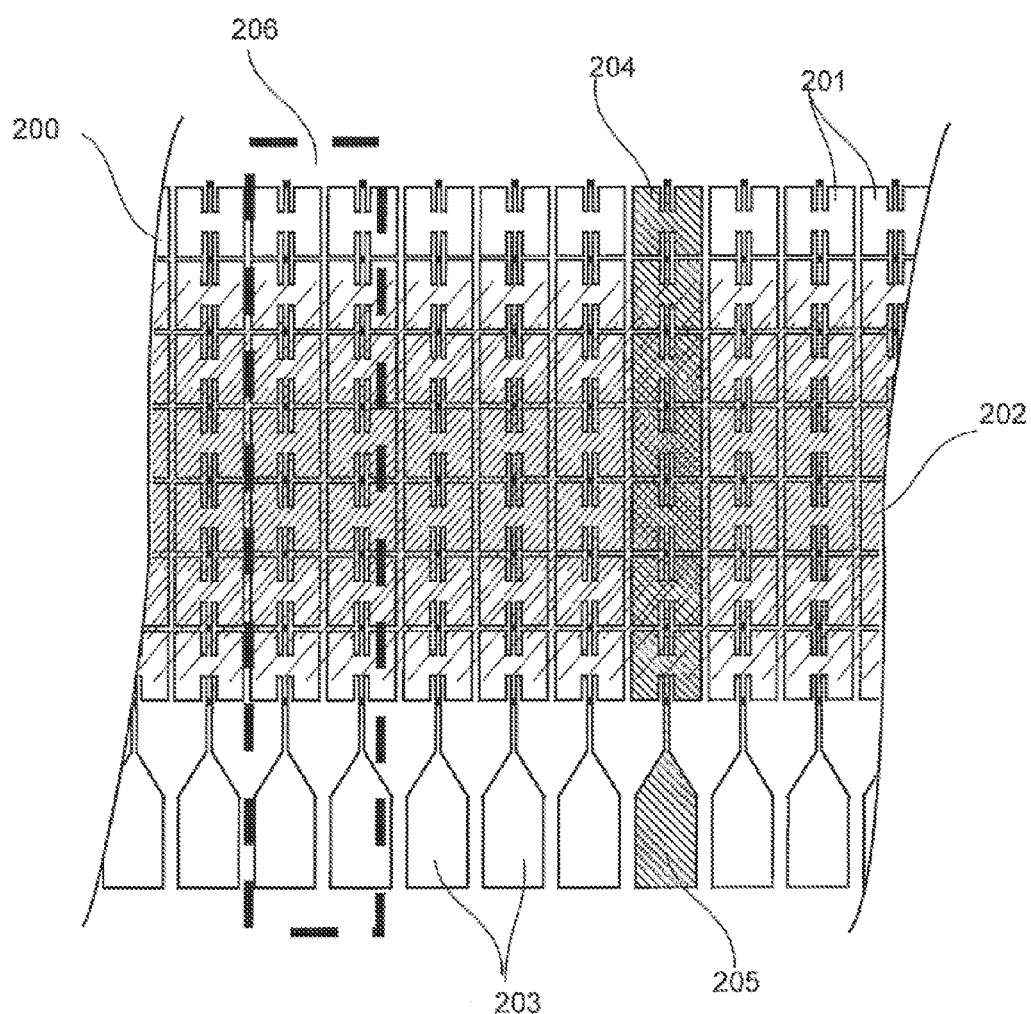
FIG. 2 shows a section of the SLM in FIG. 1a, how mirrors are connected in columns, and how the coherence areas of the illumination also form columns.

FIG. 2 reveals layered details of the SLM in FIG. 1a. The mirrors are illustrated in the image as connected in vertical columns. Coherence areas of the illumination also form columns. The array of mirrors 200 is arranged in columns 201, 204 that are controlled by voltage applied to contacts 203, 205. The contact pads are electrically coupled to a series of digital-to-analog converters. For instance, column 204 is driven by voltage applied to pad 205. In this illustration, a single voltage output of the digital-to-analog converter drives seven mirrors. In some embodiments, the illumination on the SLM surface 202, illustrated by hash marks as a non-uniform distribution, more strongly illuminates some mirrors than others. For many illumination sources, the illumination is partially coherent and can be treated as approximately coherent between two adjoining columns of mirrors 206 and incoherent between two columns which are some distance, e.g. 50 columns, apart. The illuminator design typically follows from the van Cittert-Zernike Theorem, which enables one of skill to build a satisfactory illuminator. After projection through the anamorphic optical system, the radiation relayed from the column of mirrors is merged and is not resolved among the individual mirrors at the image plane.

In this figure, the mirror axes of tilt run vertically, between two distinct black dots, so the mirrors tilt to the right or left. The mirrors illustrated are generally in the shape of an "H", with torsional elements running between the crossbar of the "H" and the pivot points illustrated as black dots. When one side of the mirror tilts up, the other side tilts down. Either the right or left side may tilt up.

Figure 3A:
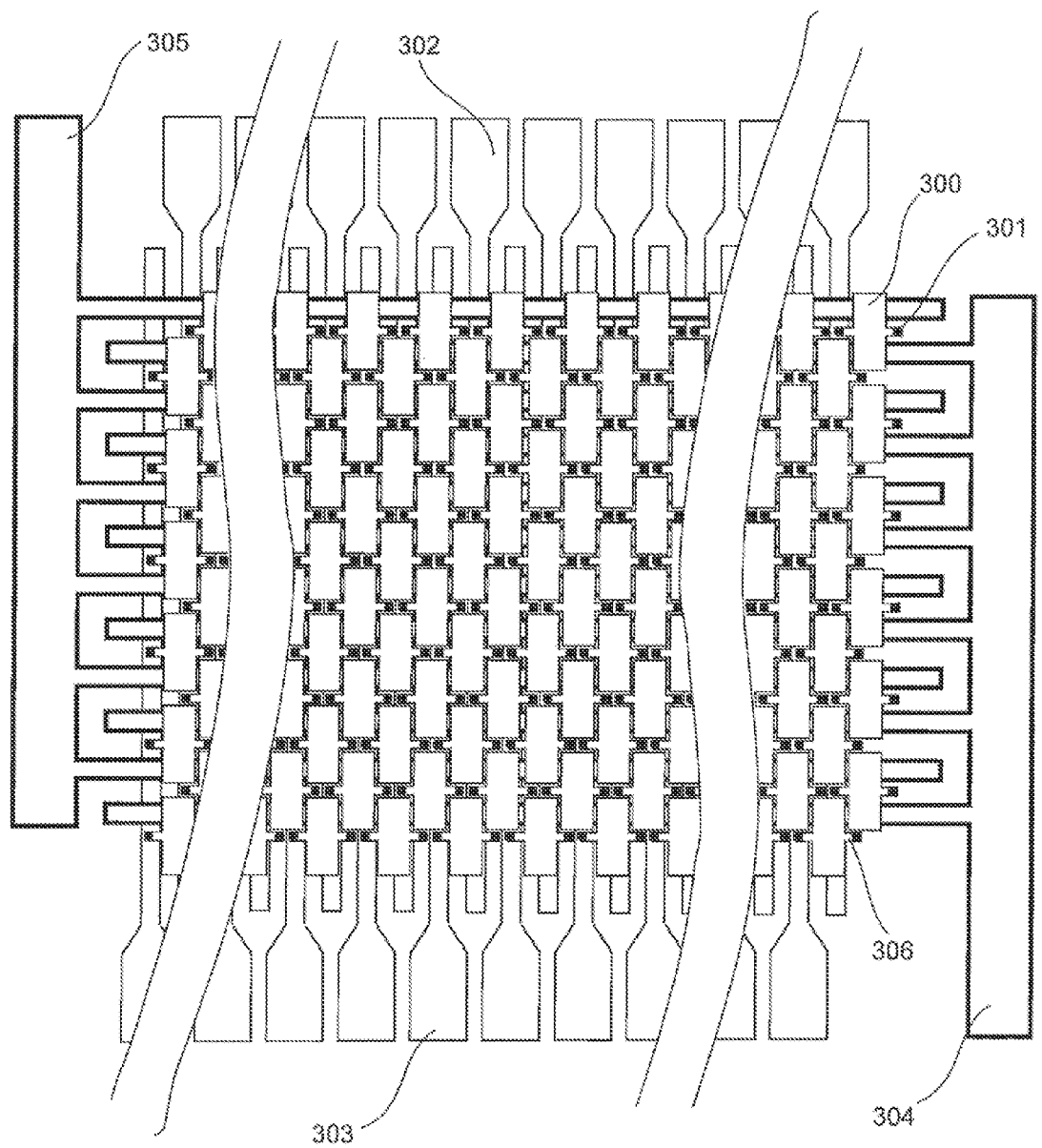
FIG. 3a shows how mirror elements of a two-dimensional array may be connected to be used as a 1D-SLM.

FIG. 3a is a variation on FIG. 2, with common busses for addressing multiple rows 305 illustrated along the sides of the array. Pads for connecting the columns to digital-to-analog converters are provided along both the top 302 and bottom 303 of the array. This optionally permits use of larger connection pads. Similarly, shared electrical connections 304, 305 are interleaved among the rows. The vertical stagger among mirror elements 300 facilitates the staggering of shared electrical connections 304, 305. The mirrors in this figure are essentially rectangular with torsional members 306 connected to pivot points 301. The illustrated mirrors tilt around horizontal axes.

The principal difference between FIG. 2 and FIG. 3a is in the mirror configuration, both the structure of an individual mirror and the vertical stagger between columns of mirrors.

Figure 3B:
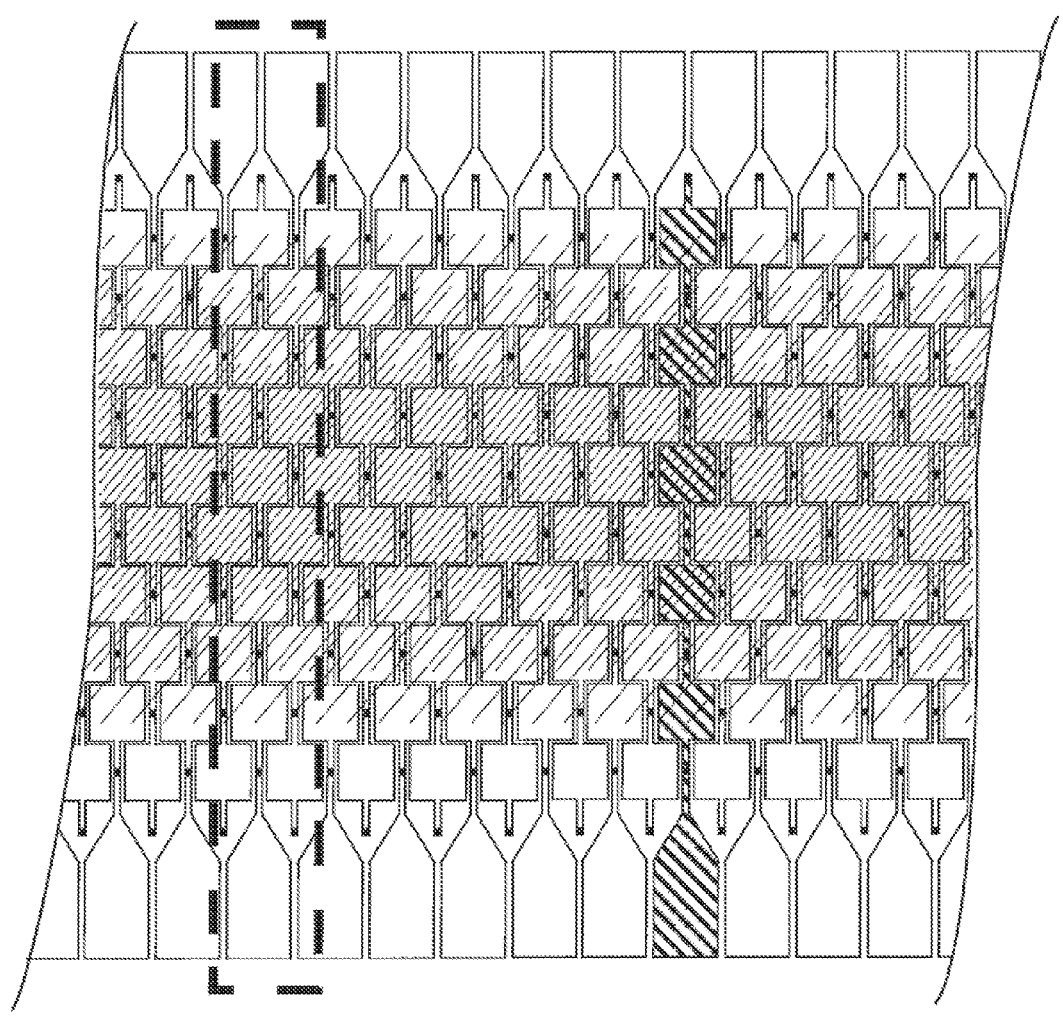
FIG. 3b shows a staggered array.

FIG. 3b is another variation on FIG. 2, with horizontal stagger, which reduces the pitch between adjacent columns of mirrors. Generally, the features of FIG. 3b are as depicted in FIG. 2, with the exception of the mirror configurations. As in FIG. 2, these mirrors pivot around a vertical axis. The mirrors have external hinge points, which allows the use of a full rectangular or square area, as opposed to using part of rectangular area for a torsional member.

FIGS. 3c to 3i present a variety of mirror configurations and tilt options. The pitch length of each configuration is indicated by $P_y$ and $P_u$. The tilt of individual mirrors is indicated by the contrast between clear and hashed areas. Different hinge patterns have different implications for interference effects between mirrors and adjoining areas. The pivot points are indicated by dots. For mirror configurations 3c and 3f, the real and imaginary parts of the mirror response, i.e. the average reflected amplitude over the surface, are plotted in FIGS. 3d and 3g, respectively. Both plots indicate balanced phase response, as the imaginary amplitude component is zero. The square mirrors that pivot from the points of their sides have an amplitude range that includes negative real amplitude.

FIG. 3c illustrates square mirrors that have pivot points in the middle of their sides. Alternate rows of mirrors have opposing tilts. These opposing tilts minimize or eliminate bias in edge placement that results from surface height variation at the workpiece, in the image plane, as explained below.

FIG. 3e illustrates rectangular mirrors similar to the square mirrors in FIG. 3c. Pivot points and opposing tilts in alternate rows are as in FIG. 3c. For mirrors that act collectively in columns, the pitch length between columns is relatively narrower in rectangular mirror configuration 3e than for square mirrors. It is useful to make $p_y$ small, since that means that there can be more separately addressed columns in a given array length.

FIG. 3f uses square mirrors with pitches similar to FIG. 3c, but with pivot points at the corners of the mirrors. In this configuration, a mirror's tilt direction can be different from the tilt of all four adjoining mirrors.

FIGS. 3g through 3i depict staggered configurations. Each of these configurations has longer $p_u$ than $p_y$, which decreases the pitch length and increases the resolution across the width of the painting beam. FIG. 3g depicts rectangles with tilts that are opposing in both a staggered column and row. FIG. 3h illustrates rhomboid shaped mirrors with tilts similar to those in FIG. 3g. FIG. 3i shows diamond shaped mirrors, which also have tilts similar to those in FIG. 3g. The staggered designs have a pitch between columns which is approximately half of the size of a mirror. It is difficult to make mirrors smaller than some limit due to mechanical and process limitations, and by staggering columns one gets more throughput and or better resolution when using an SLM with a given length for printing.

Since the mirrors are not resolved in the u direction in the image, they are collapsed into one point. Even the extreme case shown in FIG. 3h causes no gaps in the image.

Figure 4A:
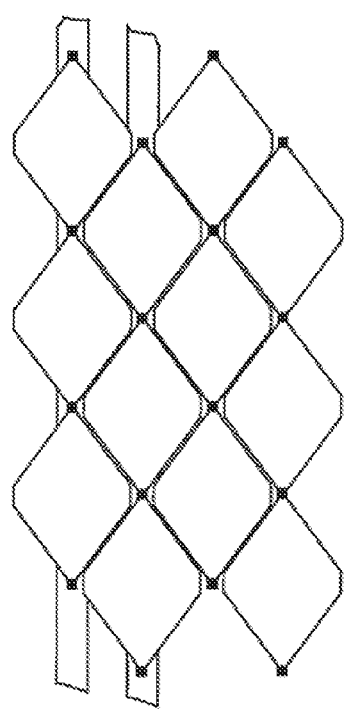
FIGS. 4a-d show possible mirror layouts.
Figure 4C:
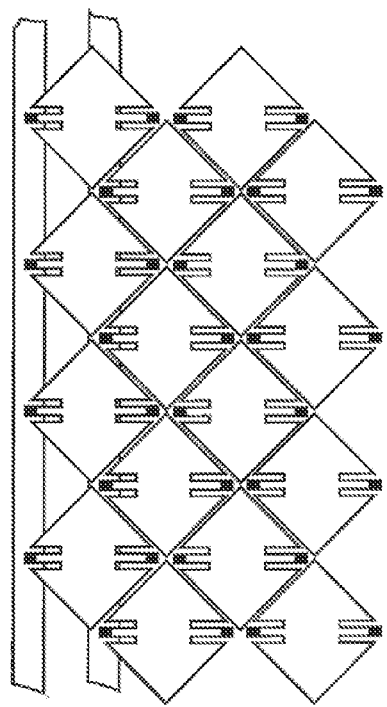
Figure 4B:
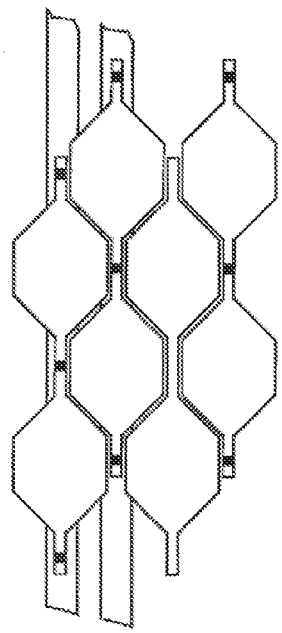
Figure 4D:
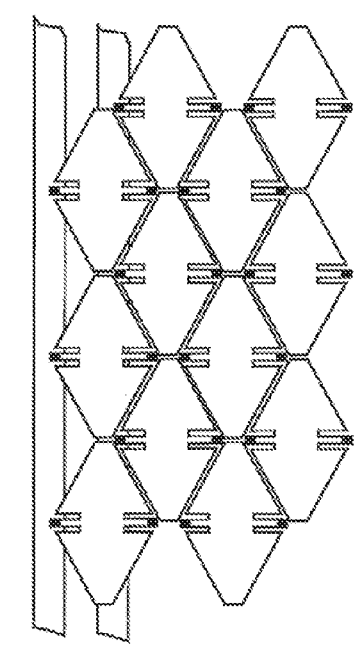
Figure 5:
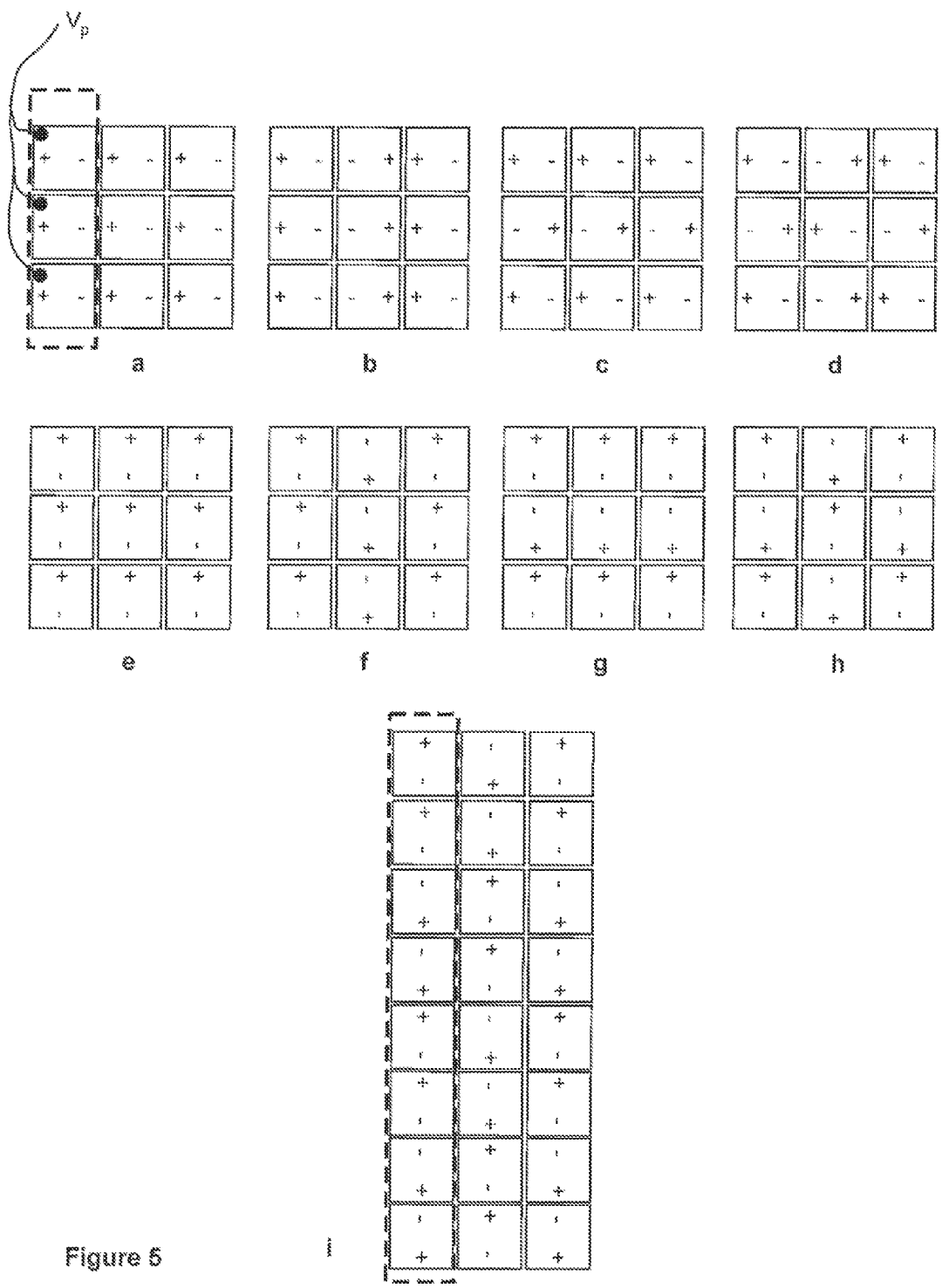
FIGS. 5 and 6 show layout pixel patterns that reduce asymmetry in the image and cross-talk between the addressed columns.
Figure 6A:
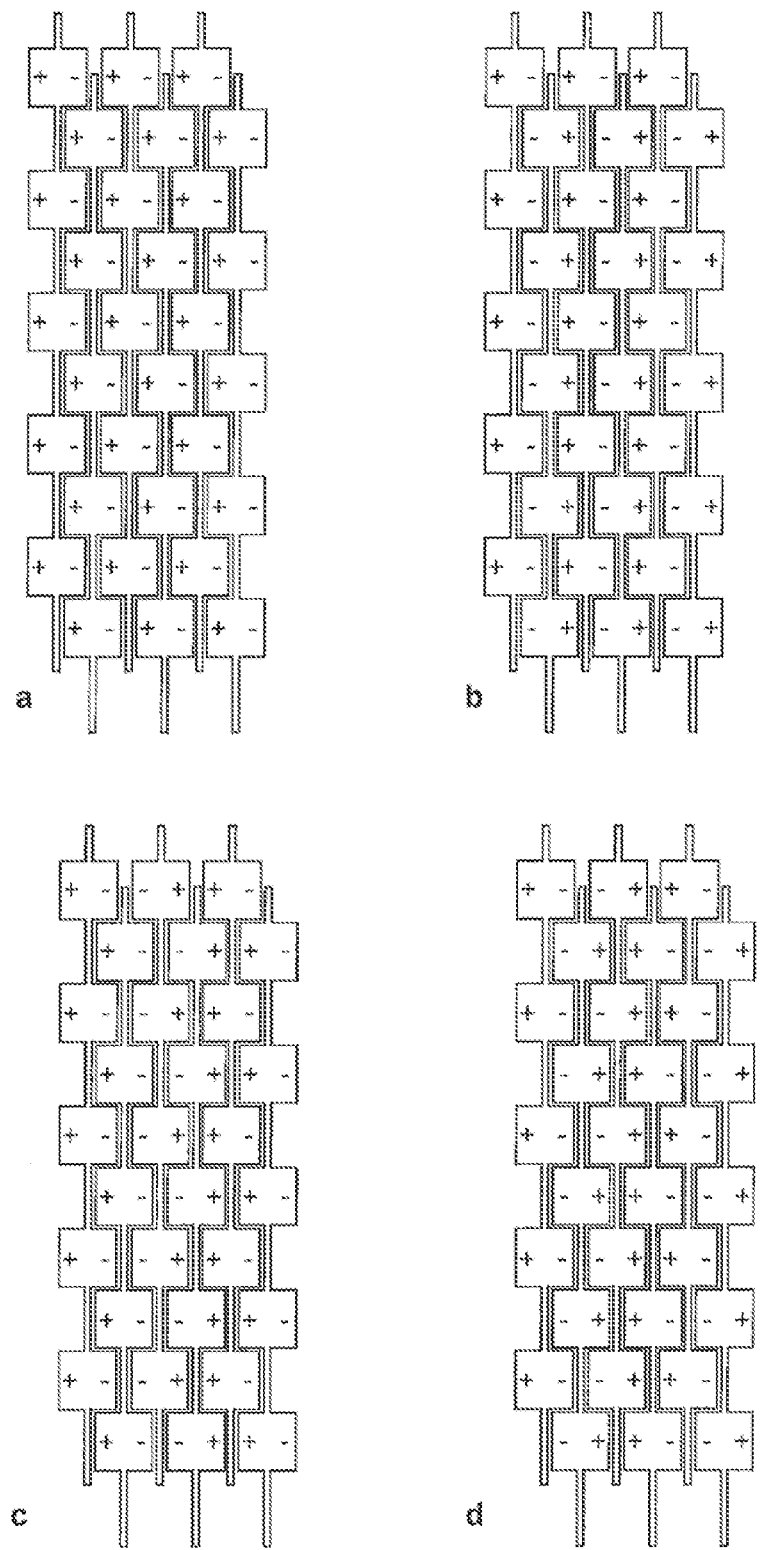
Figure 6B:
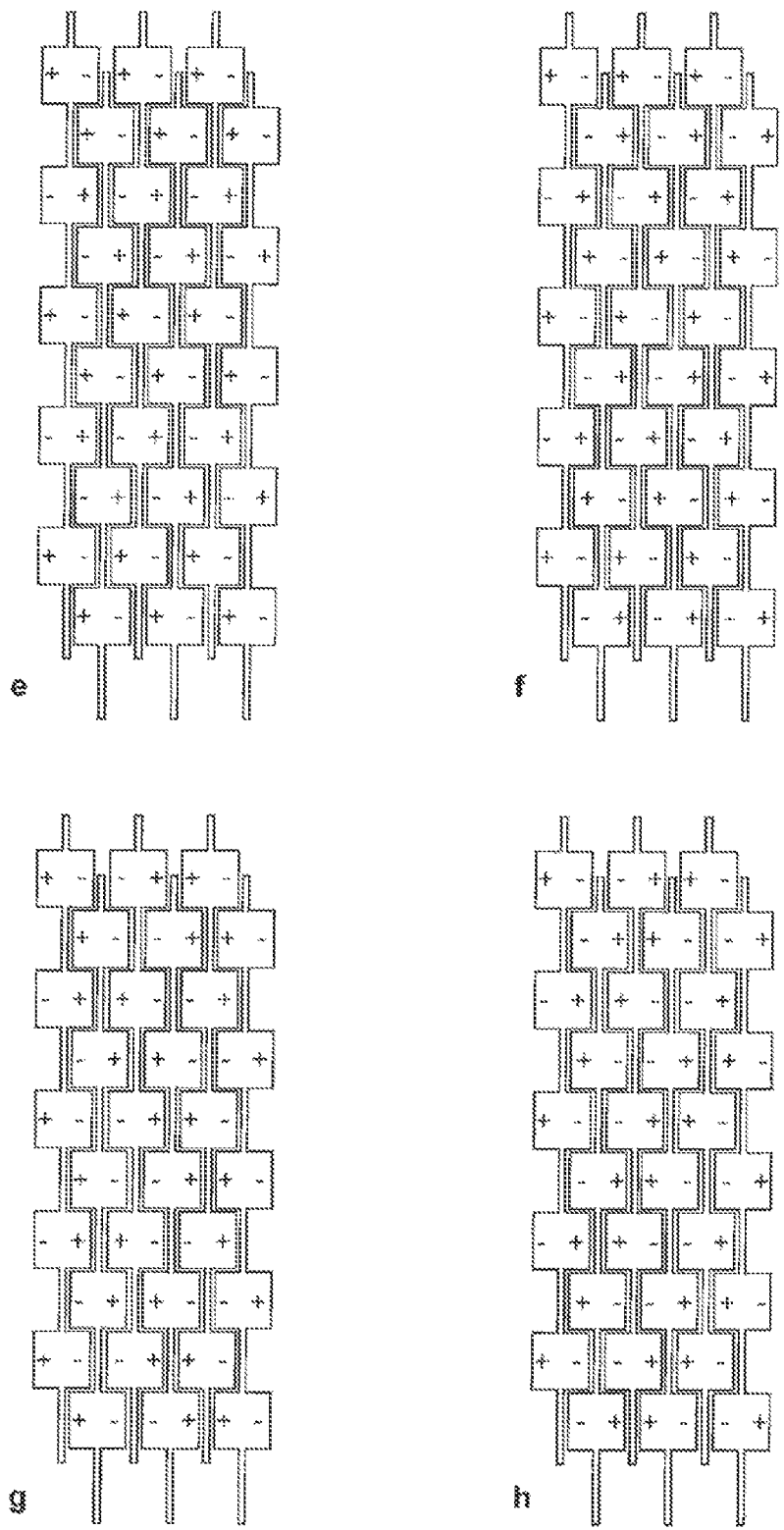

FIGS. 4a through 4d present variations on the other shapes. FIG. 4a depicts diamond shaped mirrors with clipped corners. FIG. 4b illustrates diamond shaped mirrors with severely clipped corners, which might be described as octagons. FIGS. 4c and 4d illustrate similar shapes with internal hinges. Internal hinges are depicted, which reduce the area available within the mirror surface, while improving the pitch length. With internal or hidden hinges, there is a yoke with the electrodes for electrostatic actuation and support posts and springs under the mirror. The functions are separated between the mirror, which reflects and modulates the light, and the yoke which is the actuator and mechanical support. The benefit is that materials with more optimal properties can be used in mirrors, actuators and springs, and that no area is lost to hinges and support like it is in FIG. 4c.

FIGS. 5a through 5i emphasize the patterns by applying plus and minus notations along opposing edges of mirrors. Configurations 5a-5b and 5e-5f are relatively undesirable. In the columns of these tilt configurations, the same tilt is repeated for each mirror. Given variations in focus due to imperfections in the height of the target at the image plane, systematic bias in the angle of approach for radiation relayed from the mirrors and caused by all mirrors along one edge being tilted to one side, can be a greater source of image error than the defocus-caused blur. Even with a low aperture, with an outer aperture angle of only 0.05 radians, a 100 micron variation in focus position, due to a curved target surface, for instance, can produce a 5 micron shift to the right or left when all of the mirrors tilt the same direction.

Bilateral symmetry cancels the systematic shift to the left or right. In FIGS. 5c-5d and 5g-5i, there is variation in tilt orientation among mirror elements in a column. The collective tilts of the mirrors of the column are approximately symmetrical.

FIGS. 6a-6h show staggered mirrors with various tilt configurations. FIGS. 6a-6d show relatively undesirable configurations, because all of the mirrors in a staggered column have the same tilt orientation. The tilt configurations in FIGS. 6e-6h provide improved symmetry, both between mirrors in a column that are collectively activated and between mirrors in adjoining columns.

The mirror configurations in FIG. 2 to FIG. 6h show considerable variation, but still do not cover all possibilities. In some cases the mirrors have the axis parallel with the y direction, sometimes perpendicular to it. Mirrors are square, rectangular, diamond-shaped, octagonal or hexagonal with visible or hidden hinges, staggered in u, staggered in y, or not staggered at all. Furthermore the pattern of mirrors may be straight or skewed, and the tilts may be along the u or y axes, or oblique to one or both. Tilt patterns typically are symmetrical between left and right (y), up and down (u) tilt, but many combinations and patterns are possible and only some of them are shown. All shown embodiments and many not shown will work and have the desired properties of high-speed light modulation with long lifetime under high power load. The same is true if the tilting mirrors are replaced with mirrors which are actuated up and down (pistons) or if they deform instead of tilt/translate. It is also possible to device SLMs for transmission or reflection with shutters instead of tilting mirrors.

The symmetry of row tilts taught in this application involves mirrors that are further separated than in the two-dimensional SLM strip configurations of U.S. Pat. No. 6,987,599 and U.S. Pub. No, 2002/01222237 A1. We are teaching row symmetry combined with anamorphic optics that strongly demagnify elements along the row. The row symmetry is particularly helpful when applied to workpieces other than masks, which are subject to more variations in surface height than, for instance, a carefully prepare quartz mask blank. The technology disclosed has application to flat workpieces as well as workpieces with surface height variations, so the symmetry is considered optional.

Figure 7A:
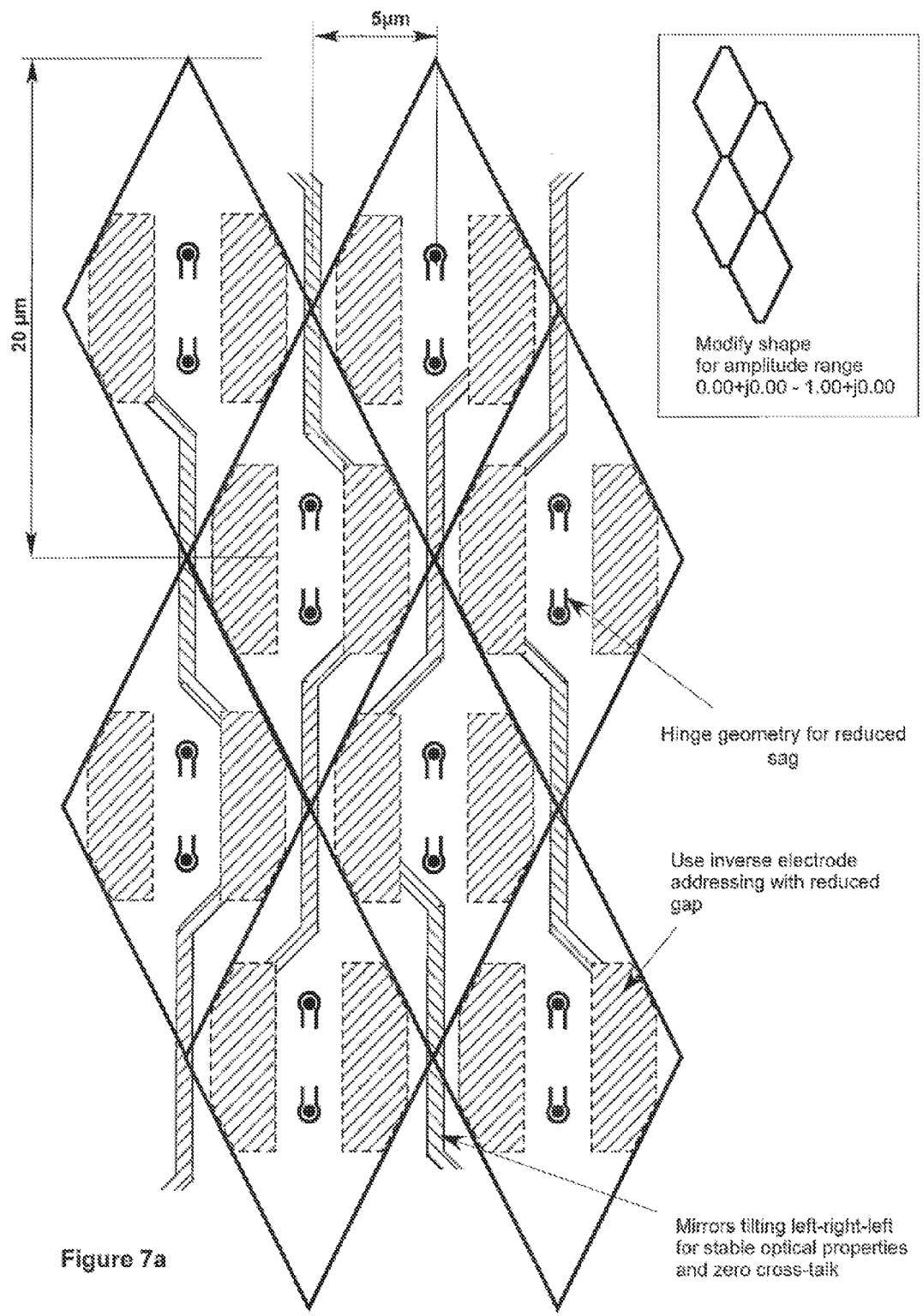
FIG. 7a depicts rhombic mirrors (optionally truncated) with hinges in the mirror surface, giving reduced sag due to balance of bending forces. The figure also lays out a possible electrode pattern.

FIG. 7a provides electrode wiring details beneath diamond shaped and rhombic mirrors. In the inset, the diamond shaped mirrors been modified to our rhombic shape so that the range of real amplitude from the mirrors is only zero-to-positive. In the figure, interconnected electrodes are positioned under alternative sides of mirrors that have alternating tilts. In this illustration, the hinges are internal to the mirror surface. The internal hinge configuration balances forces and permits use of larger mirrors or thinner mirror surfaces without undesirable bowing of the mirrors.

The mirrors in FIG. 7a have a column pitch length $p_u$ of 20 microns and a row pitch length $p_y$ of just 5 microns. In an alternative embodiment the SLM may have 8192 columns of mirrors of a staggered truncated diamond shape with enough tilt range to modulate any wavelength up to 420 nm. The pitch $p_y$ between addressable columns may be 10 microns, $p_u$ 14.4 microns and the width of the array approximately 2 mm. Alternatively, the pitch $p_y$ may be between 5 and 20, or between 5 and 10 microns and the pitch $p_u$ may be from 8 to 30 microns, or from 15 to 20 microns. Bending of better than 5 nm from flat over the length of the mirror is preferred. For long wave length and low precision applications, 10 nm bend may be acceptable. The mirrors can be operated with a pixel or dot clock up to 2 MHz and the combined data rate is 16.4 billion pixels per second. With a projected pixel area of 2.25 microns$^2$ the raw writing throughput without mechanical overhead is 370 cm$^2$/s or one square meter in 27 seconds. To expose a photoresist to 30 mJ/cm$^2$ 10 watts is needed at the workpiece or approximately 20 watts falling onto the SLM. The problem of durability of a one-dimensional SLM under such high power load is solved by allowing a larger SLM area to be used than previously known 1D SLMs. With four such SLMs and the parameters above it is thus possible to fully pattern a Generation 10 LCD mother glass of 9 m$^2$ in approximately one minute.

FIG. 7b shows a different embodiment of the invention. What makes the row of mirrors optically flat and improves speed is that there are posts and springs (flexures) distributed along the row of mirrors, i.e. typically two posts and two flexures per mirror element. In FIG. 7b the mirrors elements are made to tilt in the same direction and they are mechanically connected into long and narrow reflecting lines 701. The mirror elements in FIG. 7b have the advantage of little lost area and better uniformity in the tilt angle since the mirrors follow each other when they are mechanically connected. The picture emphasizes that the invention makes the optical pixel larger while maintaining optical flatness and high resonance frequency by having many posts and springs (flexures) in the u direction. The figure also shows hidden hinges 705 under the reflecting mirror and a yoke 703 for the electrostatic actuation. The mirror 701 is mounted on the yoke 703 with the posts 704 and the yoke 703 is actuated by the voltage on the electrodes 702. When the mirror and yoke tilts they work against the flexure 705 to give a high resonance frequency. The flexure is mounted to the substrate with a second set of posts 706.

Most of our illustrations depict tilting mirrors, but other types of mirror actions are also possible. In FIG. 7d, piston mirrors are shown. This device is similar to the device in FIG. 7b, which has hidden flexure springs and a yoke for the electrostatic actuation. From the top, there are separated mirror elements 721, 722 with an up-down action. To make a bright pixel in the image, i.e. using a column in the SLM bright the phase on all mirrors are set to 0 degrees. To make a dark pixel, half of the elements 721, e.g. every second element, are given the phase +90 degrees and the rest of the elements 722 the phase −90 degrees. In this context, we measure the phase by the phase difference of the reflected radiation, so that a 45 degree height difference produces a 90 degree phase difference in the reflected radiation. Phase angles in between 0 and 90 degrees will produce a gray pixel. It is also possible to keep some elements at 0 degrees and modulate the rest in the range 0 to 180 degrees, however, with some loss of image quality. The mirror elements 721, 722 are mounted on a yokes 724 with posts 723. In contrast to the tilting mirrors described above, the electrodes 725, 726 on the substrate cover most, or all, of the surface of the yoke and they pull it straight down with no tipping force. The yoke 724 is mounted on the substrate with posts 729 and flexure springs. Since the mirrors form two groups which should be actuated differently there are two address lines 727, 728 running under the electrodes 725, 726 and each of the electrodes is connected to one or the other address line by vias 730, 731 between electrode and line.

The anamorphic optics 106 can be designed in a number of ways. One design projects an image from the SLM to the workpiece with a large difference in magnification (typically demagnification) between u and y axes. This is optically difficult to design and make, and more difficult the larger the difference in magnification in u and y. Such a system would position the focus for both u and y axes at the SLM surface, but the demagnification in u would be so high that the two-dimensional illuminated area on the SLM collapses to one line, i.e. all illuminated u points fall within one resolved spot in the x direction in the image. Another way to describe the optics is that it forms an image which resolves mirrors in y but not in u. The resolution in the image plane is approximately the same between x and y, but in the SLM plane there is a large resolution difference, so that the resolved spot in y is typically 1.5-2 mirrors and in u it is larger than the illuminated area.

Figure 8A:
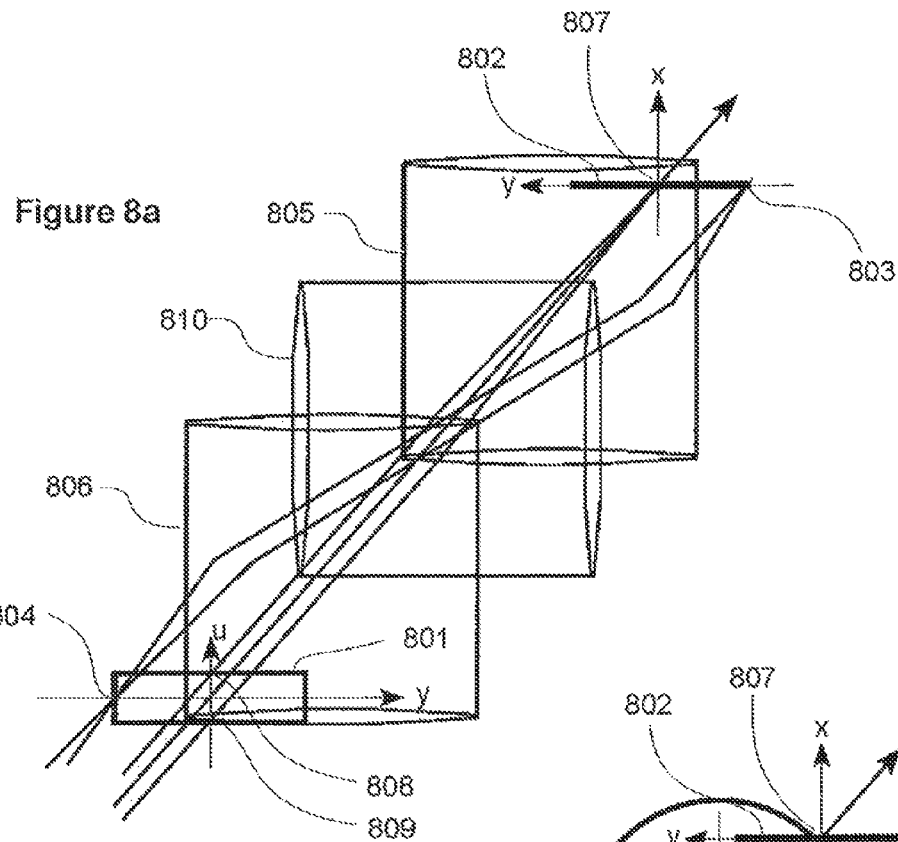
FIG. 8a shows a strongly anamorphic optical system which projects each column to a point in the image by using a 4f lens system in y and a 2f system in u. The coordinate axis u in the SLM is compressed to the point x=0 in the image and the x coordinate in the image is created by scanning. The optics may be reflecting.
Figure 8B:
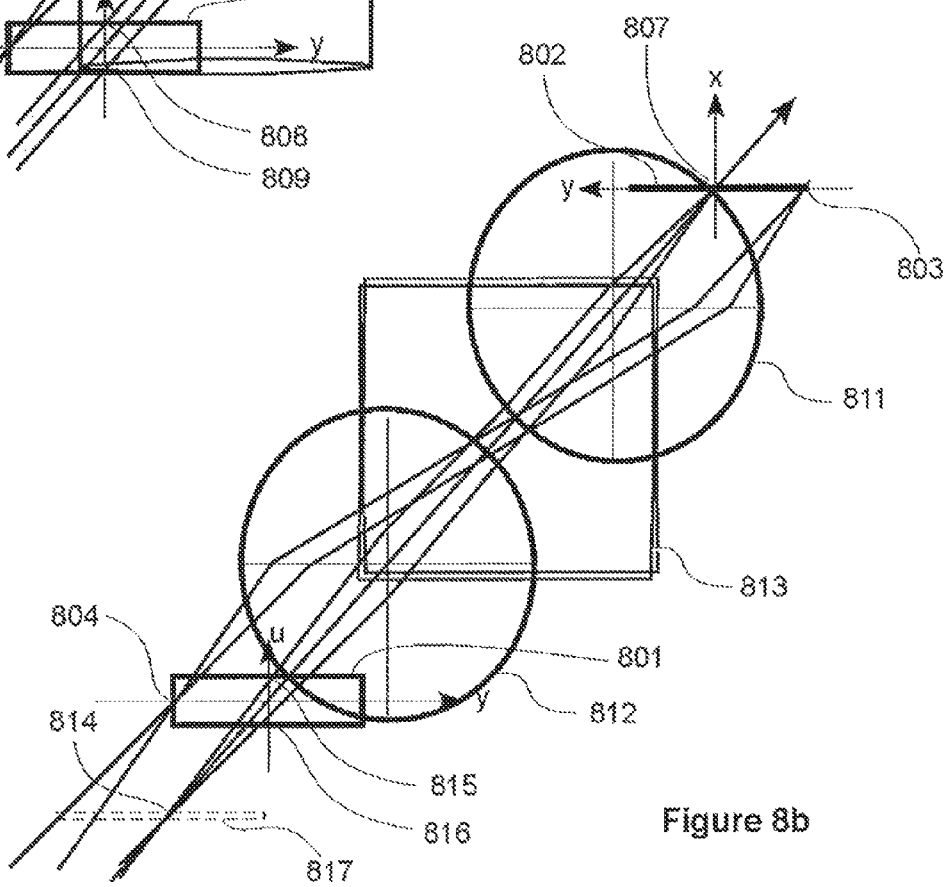
FIG. 8b shows an alternative method to spread the light in the u direction. The optical system is making an image from the object (SLM) to the image plane both in x and u, but the projection is slightly astigmatic, so that a point in front of or behind the SLM is projected sharply in x on the image plane. The footprint of the rays hitting a point in the image plane is therefore a point in y, but spread out in the u direction on the SLM.

There is a way to simplify the optics 106. Optical complexity in an anamorphic projection system can be reduced by placing the SLM away from a focus position. This is possible because the SLM has no information in the u direction which needs to be projected onto the image plane and therefore does not need a sharp image in the u direction. In the u direction, the function of the SLM is that of a flat mirror (alternatively a transmissive plate) with variable reflection (transmission). Such a mirror can be placed anywhere in the optical train with the same effect, given that the footprint of the illumination is the desired illumination area on the SLM. FIGS. 8a and 8b show two examples of optics that are simpler and less expensive, due to placing the SLM away from the focus plane.

FIG. 8a illustrates the effect of one type of anamorphic optics on a pattern formed at the object plane and projected onto the image plane. The anamorphic optical path, in this embodiment, uses a 4f lens system 805, 806 in y and a 2f system 810 in u. A line image 802 is formed from the entire illuminated area of the SLM 801. The vertical coordinate axis u in the SLM is compressed to the point x=0 in the image and the x coordinate in the image is created by scanning. The optics may be reflecting or refractive. A point 803 in y in the image has light coming from a point in y in the SLM 804, while a point in x is formed by rays 808, 809 coming from all u coordinates. In the foreground of the figure, a pair of propagation paths are depicted along the horizontal y-axis. This pair of light rays pass through first and second lenses 806, 805 and re-converge 813 on a reversed y-axis in the image plane. Also the foreground of the figure, two propagation paths 808, 809 are depicted along the vertical u-axis. As these two light rays pass through the first and second lenses which have no power in y and by the third lens 810 they are focused to converge at the origin 807 of the image plane axes. The anamorphic optics condense light rays distributed along the u-axis onto the y-axis in the image plane. An alternative description is that the SLM is placed in a Fourier plane to the image. The depicted lenses are merely an example and may be designed differently by a skilled person. Compared to a system with focus in both x and u, but with dramatically different demagnification along the two axes, this defocused system is easier to make. In particular, the cylindrical optics in the 2f part of the optics has lower power and is therefore simpler.

FIG. 8b shows a simpler and in many cases more practical embodiment using mostly spherical optics. Both u and y images are formed by spherical (or at least circular symmetric) optics 811, 812. A y point 803 is formed from a y point 804 in the SLM and in FIG. 8a. The u point 807 is formed from light in an u point 814 near but not at the SLM 801. The rays emerging from the point 814 have separated enough to span the u axis at the SLM. The different focus in u and y focus comes from a relatively weak stigmator (shown as a negative cylinder lens) 813. The light source illuminates a line 817 out of focus which then spreads it footprint to the desired width on the SLM. Since spherical lenses are easier to make and align than cylindrical ones, and this embodiment only contains a weak stigmator, the embodiment in FIG. 8b is easier and less expensive to make than the one in FIG. 8a. The scheme in FIG. 8b is relatively more advantageous when the illuminated area is long and narrow, while for a more square SLM the line 817 may fall impractically far from the SLM and the scheme of FIG. 8a may be better. Both embodiments work because of the collapse of the u axis. Since the u axis is not imaged on the workpiece, except as a degenerate point the SLM can be placed out of focus (FIG. 8b) or at a Fourier plane (FIG. 8a).

Figure 9A:
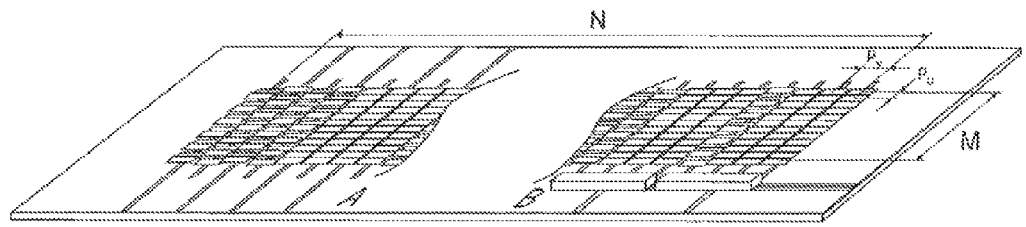
FIG. 9a shows how the columns of mirrors are connected to pads, e.g. for bonding to external circuits (A) and, alternatively, (B) to multiplexors which reduce the number of pads by a factor of 4, 8, 16, 32 or another small integer number.
Figure 9B:
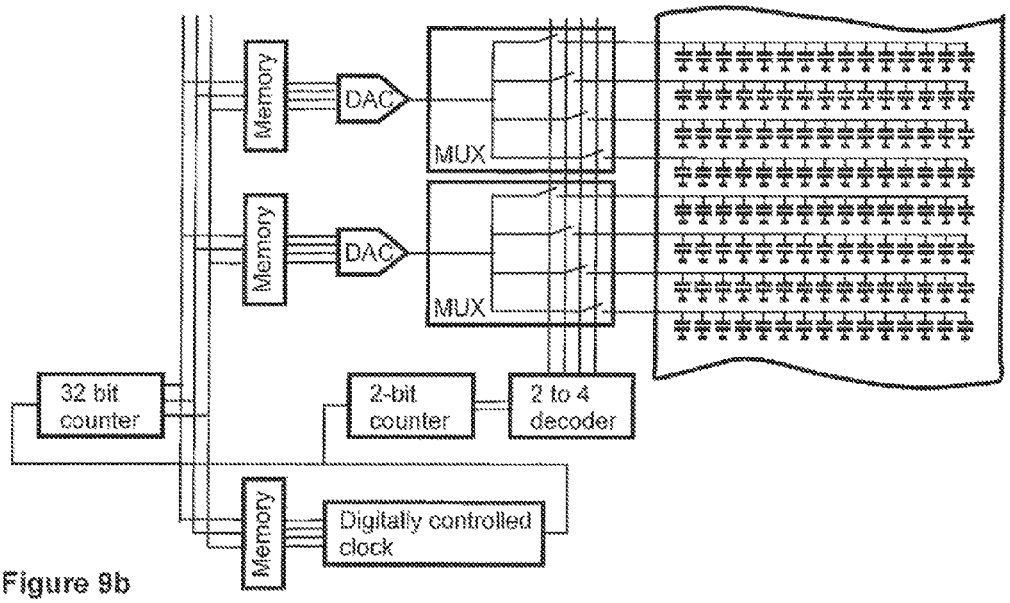
FIG. 9b shows how the pads may be connected DAC driven by a large memory buffer containing the pattern data. The DACs are fanned out through multiplexors (MUX), here 1-to-4 multiplexors scanning four columns repeatedly. A digital clock may be used to control the reading from the memory and the clock itself can be controlled by data in a memory.
Figure 9C:
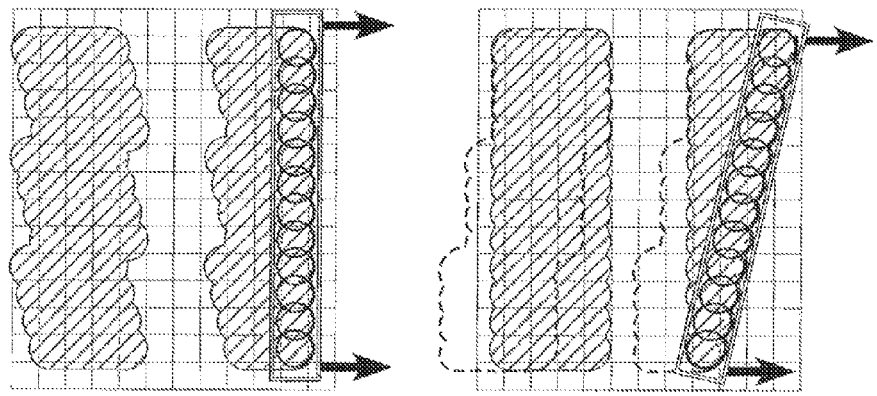
FIG. 9c shows that the scanning of the MUX channels may give an edge roughness (left) and that rotation of the SLM may restore the desired grid and smooth edge writing. The dashed area is the result of the tilting of the SLM with unmodified data. The hatched area is the pattern after the data has been shifted to remove the steps in the dashed figure.

FIGS. 9a-9b illustrate how the number of digital-to-analog converters used to drive the mirrors can be reduced using muxes. The multiplexers reduce the number of pads by a factor of less than or equal to four, eight, 16, 32 or another small integer number less than or equal to 128. The small number of control lines determine the current state of the muxes.

In some applications of the technology disclosed, the problem of fashioning a 1D SLM with high modulation speed and power handling is addressed by combining multiple modulating elements into a single modulated/addressed unit and imaging the combined unit onto an image plane so that relayed radiation from the multiple modulating units is superimposed onto a single point of the image plane. This increases the potential modulation speed, due to use of small elements, and increases a power handling, due to the large surface area of combined units. This also has a reduced complexity and improved averaging resulting from the combined units.

In other applications, the problem of fashioning a 1D SLM with projection angles that are insensitive to out of plane deformation of a workpiece is addressed by using an SLM geometry that includes multiple, tilting modulating elements combined into a single modulated/addressed unit, where a first and second sets of the multiple modulating elements have tilts that are essentially opposed and projection optics that relay radiation from the multiple modulating units is superimposed onto a single point of the image plane. In this approach, the out of plane deformation effectively defocuses the projected image instead of displacing the projected image.

In other applications, the problem of fashioning a tilting mirror SLM which has black and white states (0+0 j, 1+0 j) insensitive to small errors in tilt angles is addressed by shaping geometry of the mirrors to have a first minimum of the real part of its complex amplitude resulting from diffraction effects while being actuated from the white state in the direction of the dark state that is 0, whereby the system is less dependent on calibration and mirror dynamics. The geometry can include steps or structures and projected area shape. The average amplitude vs. tilt angle can be evaluated in the following way: The surface of the mirror is divided into surface elements, e.g. in a 10 by 10 grid. The mirror is tilted to an angle α and the height of each point in the grid is calculated. From the height the complex amplitude can be calculated using the complex reflection coefficient of the surface and the area of the mirror that is represented by said grid point. The amplitudes are summed over the grid and divided by the number of grid points. The calculation can be made with account for non-flat mirrors, bending during actuation, non-uniform surface properties, etc. The resulting complex value is normalized to 1+0 j for the mirror at rest (or in the white state if that is different). The calculation is repeated for a representative set of tilt angles. The design of the mirror can be changed until the calculated complex values satisfy the requirements, e.g. follows the trajectory in FIG. 3g.

Some applications of this technology address the problem of fashioning a 1D SLM with a small pitch in one direction, a high fill form factor, and a geometry that is manageable for reproducible manufacturing by using multiple tilting mirror elements combined into a single modulating/addressed unit, using the mirror elements overlapped between adjoining columns, the mirror elements clipped or stemmed from a quadrilateral shape to have desirable soft landing characteristics.

Some of the problems addressed in these manners are problems that these inventors first realized in the course of developing new applications for their new SLM with anamorphic optical path.

This life-extending, power density reducing use of small mirrors collectively can readily be combined with the redundant mirror described below.

Oversized SLMs with Redundant Columns or Rows

Figure 10:
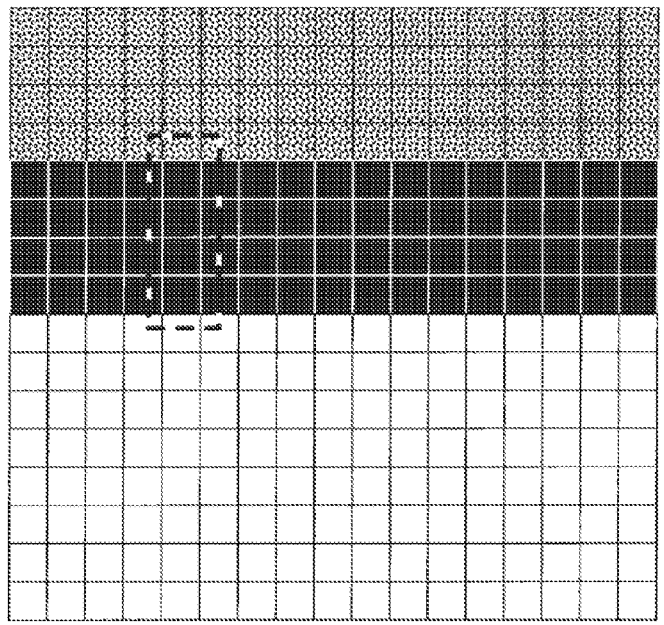
FIGS. 10-12 illustrate an oversized array of elements, which is oversized in the sense that only a fraction, less than half of the elements, are required to modulate light at one time.

FIGS. 10-12 illustrate an oversized array of elements, which is oversized in the sense that only a fraction, less than half of the elements, are required to modulate light at one time. In FIG. 10, about one-quarter of the elements are illustrated as modulating light at one time. When one so-called bank of four elements shows signs of fatigue or failure, another bank of four elements can be substituted. The banks of elements may overlap, as shown in FIG. 11, or they may consist of distinct, non-overlapping sets of elements, as shown in FIG. 10. If, for example, the micro-mechanical light modulator has four times as many elements as are used at once, then the oversized light modulator should have at least four times the useful life of a non-redundant modulator. Depending on the pattern of element failure and the pattern of failover recovery, the life of a redundant device can well exceed the ratio of elements used at one time to available elements.

The life of a device in which multiple elements are addressed as a single unit can be extended by limiting the elements to which the mirror actuating signal is applied. For instance, in FIG. 10, the fifth through eighth rows are dark grey and currently used. A bank selector can be used to control which rows are currently used and activated. At a first time, the bank selector may distribute the actuation signal to columns one to four. At a second time, the bank selector distributes actuation signals to rows five through eight. Transistors or other switch components responsive to row signals can be used to control distribution of column signals. The row signal can either enable or block delivery of modulation signals on a row-by-row basis. Then, column signals that address groups of elements are distributed to the appropriate rows without any modification of the algorithm which modulates columns of elements. In this context, the row signals can be called bank-selector signals and the column signals can be called element-modulator signals.

Alternatively, one could modulate more elements than intended to be illuminated or more elements than actually illuminated. This would simplify the control circuitry, potentially at the cost of reducing the life of alternate banks of elements when they are called on to replace a failed or degraded bank.

Various patterns of illumination can be applied, along side various schemes for determining which part of the array is illuminated. Illumination can be applied to the entire array and only a portion of the array is allowed to relay radiation onto the image plane. Or, an aperture can be adjusted to control illumination that would otherwise illuminate the whole array. Alternatively, the illumination could be applied to an area approximating the active area of the array. The illumination can be targeted to just the active area or to a slightly larger area that reduces risk of incomplete illumination of elements at the borders between active and inactive areas.

Out technology includes a reconfigurable micro-mechanical light modulator including a two-dimensional array of modulating elements with reflecting surfaces organized in multiple rows and columns. The modulating elements are adapted to modulate light impinging on the micro-mechanical light modulator. The array of modulating elements comprises a first and a second set of modulating elements where the second set is a redundant set of modulating elements being configured to be activated in order to substitute the first set of modulating elements in modulating light impinging on the micro-mechanical light modulator, without physically replacing the micro-mechanical light modulator.

The part of the array illuminated can be determined by physically moving the array. A micrometer mechanism, for instance, could be used to move the array and change the bank of elements in the illumination path, without requiring any adjustment to the relay path between the device and the image plane. Alternatively, the illumination path could be varied, so that illuminating radiation is redirected onto a different part of the array. Compensating variations in the relay optical path or in the tilt of the micro-mechanical device would be required to compensate for modifying the illumination path.

In one embodiment, using tilting mirrors, adjoining rows of mirrors tilt in opposing directions, as described above. Many patterns of opposing actuation are possible, depending on the configuration of the mirrors.

In another embodiment, illustrated by FIG. 12, the micro-mechanical device can be tuned by varying the number of elements that function together. In FIG. 12, four elements initially functioned together. In the expanded configuration, eight elements function together. Again, the elements functioning together can either be addressed individually, or at a single address using just one signal.

Some Particular Embodiments

The present invention may be practiced as a method, a device or an article of manufacture such as machine-readable storage media loaded with computer program instructions. It could, alternatively, be practiced as a machine-readable transmission media, such as a signal carrying program instructions to be stored in a memory.

One embodiment of the technology described is a micromirror light modulator. This modulator may combine high-speed and high power handling by collectively actuating elements in a column. This modulator includes a two-dimensional array of reflecting elements organized in columns to be actuated by a single input per column. It further includes electronic connections among actuators of the reflecting elements in a column, whereby a single input actuates multiple elements in a column. Alternatively, this modulator includes an array of reflecting areas organized in columns wherein the reflecting areas are segmented into elements. It further includes electronic connections among multiple actuators of the elements in a column, whereby a single input signal actuates the multiple actuators in the column.

The elements of either modulator in the column have resonance frequencies of greater than or equal to 500 KHz, greater than or equal to 1 MHz, or greater than or equal to 2 MHz.

The elements of either modulator in the column may bend, when fully actuated, less than or equal to 5 nm or 10 nm from flat across the reflecting surface of the element. This bend criteria may apply directly to the elements or in combination with any of the resonance frequency criteria.

The elements of either modulator in the column may be sized to fit within a rectangle no larger than 20 by 30 microns, a rectangle no larger than 10 by 20 microns, a rectangle no larger than 5 by 15 microns or a rectangle about 10 by 14.4 microns. These size criteria may apply directly to the elements or in combination with the bend and/or the resonance frequency criteria.

In either modulator described above, the elements may be piston actuated to positive and negative phase differences. In the piston case, the modulator further includes first electronic connections among first multiple actuators in the column, which respond to a first input signal to produce a positive phase difference, and second electronic connections among second multiple actuators in the column, which respond to a second input signal to produce a negative phase difference.

One aspect of these modulators is that they may further include a bank selector the controls electronic connections among actuators. The bank selector selects among the rows and columns to be actuated by a single input.

The selected rows in the modulator may be contiguous.

The single input to any of these modulators may be an analog voltage calibrated to actuate the reflecting elements to produce a controlled phase difference between adjoining reflecting elements or between adjoining portions of the reflected radiation. By adjoining, we mean within a distance that effectively produces diffractive interference.

The modulator may further include tilting elements and electronic connections among the actuators of the tilling elements that cause selected elements the column to actuate in differing directions with the vector sum of the differing directions the zero or close to zero. When an even number of elements in the column are actuated, the vector sum of the differing directions should be approximately 0, subject to manufacturing and calibration tolerances. When an odd number of reflecting elements are actuated, one more element will be actuated in a first direction that in the second direction, thereby producing a vector sum of the differing directions that is close to zero, but not approximately 0.

Any of the modulators described may be combined with a movable modulator base that positions the modulator to modulate radiation using selected rows in a column. In some implementations, at least some unused rows of modulator may be shielded from exposure to radiation. In some implementations, some rows of the modulator receive decreased radiation, relative to a center of the selected rows of the modulator.

Alternatively, the modulator described can be combined with redirectable illumination and relay paths, which use selected rows in a column of the modulator to modulate radiation.

Any of the modulators described above may be combined with the anamorphic optical path that receives modulated radiation from the reflecting elements and demagnifies the modulated radiation along one axis of the two-dimensional array, thereby concentrating relayed radiation from the two-dimensional array onto a narrow segment or line. This narrow segment may be about 3 μm or 5 μm wide. The narrow segment may be less than 5 μm or 10 μm wide.

Stated differently, the modulators described above may be combined with an anamorphic optical path that receives modulated radiation from the reflecting elements and demagnifies the modulated radiation along one axis of the two-dimensional array to an extent that individual reflecting elements in a particular column are not resolved at an image plane. The demagnified column of elements may be concentrated onto an area about 3 or 5μ wide or less than five or 10μ wide.

In certain applications requiring higher resolution, such as patterning for nanotechnology surfaces, masks, and templates, the width of the segment or line in the image may be smaller. With proper choice of the wavelength and optical resolution and demagnification the segment width may be approximately 2 microns, 1 micron, 0.5 microns or even approximately 0.25 microns. In an envisioned embodiment the wavelength may be in the range 248 to 266 nm and the numerical aperture of the optics in the u direction 0.85 giving a line approximately 160 nm wide. In other embodiments the wavelength may be approximately 193 nm or 355 nm and the optics may have an NA of 1.35 (using immersion) or 0.75 respectively giving a width of the segment of approximately 70 nm or 240 nm respectively. It is also possible to apply the improved SLM to EUV writing with a wavelength of 13 nm and an NA of 0.25 giving a line 26 nm wide. In the future it may be possible to use EUV wavelengths around 6 nm and small-field optics with NA=0.5 giving a line only 6 nm wide. The smallest feature which can be printed in the x direction is typically 150-200% of the width of the line, i.e. 240-320, 105-140, 360-480, 40-50, and 9-12 nm for the combinations in this paragraph. In the y direction features may be printed down to about 100% of the calculated segment width, and optimized printing of special features, such as lines in a grating, may reach 50% in bright lines, i.e. 80, 35, 120, 13 and 3 nm respectively, and a factor of two smaller with dark lines.

The device embodiment of the technology described can readily be restated in methods. One such method may combine high-speed and high power handling by collectively actuating elements in a column. This method includes receiving an electronic signal intended to control a plurality of elements in a column of a 2D array of elements with reflecting surfaces, wherein the array includes a multitude of individually actuated elements organized in multiple rows and columns. It further includes orienting a plurality of the elements in the column responsive to the electronic signal by energizing multiple actuators in the column responsive to a single input signal. Alternatively, this modulator includes an array of reflecting areas organized in columns wherein the reflecting areas are segmented into elements. The method includes receiving an electronic signal intended to control a plurality of elements in an array of reflecting areas organized in columns wherein the reflecting areas are segmented into elements, wherein the array includes a multitude of individually actuated elements organized in multiple rows and columns and orienting the plurality of elements as described.

The elements actuated in either method may be driven at or near element resonance frequencies of greater than or equal to 500 KHz, greater than or equal to 1 MHz, or greater than or equal to 2 MHz. An element is driven near its element resonance frequency when the shortest period of alternating element orientations, as the element is adjusted, is within ten percent of the element's design resonance frequency.

The elements of either modulator in the column bend, when fully actuated. A further aspect of the methods is that the elements bend, when fully actuated, less than or equal to 5 nm or 10 nm from flat across the reflecting surface of the element. This bend criterion may apply directly to the elements or in combination with any of the resonance frequency criteria.

The elements of either modulator in the column may be sized to fit within a rectangle no larger than 20 by 30 microns, a rectangle no larger than 10 by 20 microns, a rectangle no larger than 5 by 15 microns or a rectangle about 10 by 14.4 microns. This size criterion may apply directly to the elements or in combination with the bend and/or the resonance frequency criteria.

In either method described above, the elements may be piston actuated to positive and negative phase differences. In the piston case, the method further includes actuating first multiple actuators in the column in response to a first input signal to produce a positive phase difference, and actuating second multiple actuators in the column in response to a second input signal to produce a negative phase difference.

One aspect of these methods is that they may further include controlling a bank selector to selects among the rows to be actuated by a single column input, wherein half or fewer of the rows in the column are selected at once.

The selected rows in the modulator may be contiguous.

The single input to any of these modulators may be an analog voltage calibrated to actuate the reflecting elements to produce a controlled phase difference between adjoining reflecting elements or between adjoining portions of the reflected radiation. By adjoining, we mean within a distance that effectively produces diffractive interference.

The method may further tilting elements by applying signals to tilt actuators of that cause selected elements the column to tilt in differing directions with the vector sum of the differing directions the zero or close to zero. When an even number of elements in the column are actuated, the vector sum of the differing directions should be approximately 0, subject to manufacturing and calibration tolerances. When an odd number of reflecting elements are actuated, one more element will be actuated in a first direction that in the second direction, thereby producing a vector sum of the differing directions that is close to zero, but not approximately 0.

Any of the method described may be combined with a positioning movable modulator base to modulate radiation using selected rows in a column. In some implementations, at least some unused rows may be shielded from exposure to radiation. In some implementations, some rows receive decreased radiation, relative to a center of the selected rows of the modulator.

Alternatively, the methods described can be extended to include redirecting illumination and relay paths to use selected rows in a column of the modulator to modulate radiation.

Any of the methods described can be extended to directing modulated radiation from the elements along an anamorphic optical path that demagnifies the modulated radiation along one axis of the two-dimensional array, thereby concentrating relayed radiation from the array column onto a narrow segment or line. This narrow segment may be about 3 µm or 5 µm wide. The narrow segment may be less than 5 µm or 10 µm wide.

Stated differently, the methods described can be extended to directing modulated radiation from the elements along an anamorphic optical path that demagnifies the modulated radiation along one axis of the two-dimensional array to an extent that individual reflecting elements in a particular column are not resolved at an image plane. The demagnified column of elements may be concentrated onto an area about 3 or 5µ wide or less than five or 10µ wide.

In certain applications requiring higher resolution, such as patterning for nanotechnology surfaces, masks, and templates, the width of the segment or line in the image may be smaller. With proper choice of the wavelength and optical resolution and demagnification the segment width may be approximately 2 microns, 1 micron, 0.5 microns or even approximately 0.25 microns. In an envisioned embodiment the wavelength may be in the range 248 to 266 nm and the numerical aperture of the optics in the u direction 0.85 giving a line approximately 160 nm wide. In other embodiments the wavelength may be approximately 193 nm or 355 nm and the optics may have an NA of 1.35 (using immersion) or 0.75 respectively giving a width of the segment of approximately 70 nm or 240 nm respectively. It is also possible to apply the improved SLM to EUV writing with a wavelength of 13 nm and an NA of 0.25 giving a line 26 nm wide. In the future it may be possible to use EUV wavelengths around 6 nm and small-field optics with NA=0.5 giving a line only 6 nm wide. The smallest feature which can be printed in the x direction is typically 150-200% of the width of the line, i.e. 240-320, 105-140, 360-480, 40-50, and 9-12 nm for the combinations in this paragraph. In the y direction features may be printed down to about 100% of the calculated segment width, and optimized printing of special features, such as lines in a grating, may reach 50% in bright lines, i.e. 80, 35, 120, 13 and 3 nm respectively, and a factor of two smaller with dark lines.

Another embodiment of the technology described is a method using a two-dimensional array of reflecting elements organized in multiple rows and columns. This method includes actuating multiple reflecting elements in a column to modulate radiation, using a single input signal to collectively actuate the multiple reflecting elements and to produce a controlled phase difference between portions of radiation reflected by the reflecting elements. This controlled phase difference uses diffractive effects to produce bright and dark areas and, optionally, to produce grayscale areas in an image plane.

The method optionally include selecting a bank of contiguous rows that includes less than half of the reflecting elements in the columns and illuminating and modulating the selected bank of rows.

A further aspect the method includes actuating the reflecting elements to tilt and actuating the reflecting elements in a column to tilt in differing directions, with the vector sum of the differing directions that is zero or close to zero. Depending on whether an even or odd number of reflecting elements are actuated, the vector sum may be approximately 0 or close to zero, as described above.

The method may further include repositioning the two-dimensional array using an adjustable base to position the two-dimensional array to modulate radiation using of selected bank of rows. Alternatively, an adjustable illumination and relay path may be used to modulate radiation using the selected bank of rows.

The method may further include relaying radiation from the reflecting elements through an anamorphic optical path that demagnifies the radiation along one axis of the two-dimensional array to an extent that individual reflecting elements in particular column are not resolved at an image plane. The demagnified reflecting elements may be projected onto an area about 3µ or 5µ wide or onto an area that is less than five or 10µ wide.

Another embodiment of the technology disclosed is a micromechanical radiation modulating device including redundant rows of contiguous modulating elements. This modulating device further includes a bank selector that selects rows of the elements to be used in banks to modulate radiation, so that a second bank replaces the first bank by changing the rows of elements used, without replacing the modulating device.

In some implementations, the micromechanical device includes micro mirrors operating in a diffraction mode. Such micro mirrors may tilt or be actuated by a piston motion. Among tilting mirrors, the device may further include electronic connections among actuators of the micro mirrors that cause the micro mirrors in columns to actuate in differing directions with a vector sum of the differing directions that is zero or close to zero.

The modulating elements may be addressed relative to the selected bank. Thus, the bank selection may be transparent to most or all of the generation of modulation data to be sent to the modulating device.

Another embodiment is a method of affording redundancy in a micro-mechanical radiation modulating device with multiple rows of columns elements. This method includes selecting, to be modulated, banks of contiguous rows that include less than half of the elements in the columns. The method further includes modulating elements a first bank of elements for a first time. Then, modulating elements in a second bank of elements, for a second time, in place of modulating the first bank of elements. Thus, the second bank can be used in place of the first bank without replacing the device.

In some implementations, the first and second banks of elements may be overlapping. When the second bank of elements is selected due to actual or imminent failure of elements in the first bank, the second bank of elements does not include the failed or failing elements of the first bank. This alternatively may be accomplished by using first and second banks that are not overlapping.

In other implementations, the second bank of elements may include all of the rows of the elements in the first bank and additional rows contiguous to the rows in the first bank.

A further embodiment of the methods described above is an article of manufacture that includes a machine-readable storage medium that stores instructions to be executed by a computing device that implements any of the methods described above.

Another article of manufacture is a machine-readable storage medium that stores instructions which, when loaded onto a combination of an optical and computing device, produces any of the devices or systems described above or enables the combined optical and computing device to practice any of the methods described above. Yet another article of manufacture is a machine readable storage medium that stores instructions which, when used to produce micro mechanical devices, produces such devices as described above or produces devices that carry out the methods described above.

The article of manufacture described the preceding paragraph may alternatively be embodied in a machine-readable transmission medium that conveys instructions as described.

We claim as follows:

1. A reconfigurable micro-mechanical light modulator, including:
   a 2D array of modulating elements with reflecting surfaces organized in multiple rows and columns, the modulating elements being adapted to modulate light impinging on the micro-mechanical light modulator;
   wherein the array of modulating elements includes first and second sets of modulating elements, and the second set of modulating elements is configured to be selected to replace the first set of modulating elements of said array of modulating elements in modulating light impinging on the micro-mechanical light modulator, without replacing the array; and
   a bank selector controls electronic connections among actuators and modulating elements in a column and actuates the column of modulating elements responsive to a single input.

2. The modulator of claim 1, wherein:
   the bank selector coupled to the array controls whether the first or second set of modulating elements is currently available to modulate the light.

3. The modulator of claim 1, wherein the second set of modulating elements includes none of the modulating elements of the first set of modulating elements.

4. The modulator of claim 1, wherein the second set of modulating elements includes all of the modulating elements of the first set of modulating elements.

5. The modulator of claim 1, wherein the second set of modulating elements includes at least one of the modulating elements of the first set of modulating elements.

6. A method of reconfiguring a micro-mechanical light modulator, including:
   using a first set of modulating elements to modulate light impinging on a micro-mechanical light modulator that includes a 2D array of modulating elements with reflecting services organized in multiple rows and columns, wherein a column of modulating elements are actuated responsive to a single input;
   selecting a second set of modulating elements from the 2D array to be used for modulating the light impinging on the micro-mechanical light modulator; and
   using the second set of modulating elements in place of the first set, without replacing the 2D array; and
   using a bank selector which controls electronic connections among actuators and modulating elements in a column and actuates the column of modulating elements responsive to a single input.

7. The method of claim 6, further including signaling the bank selector coupled to the 2D array to select the second set of modulating elements in place of the first set.

8. The method of claim 7, wherein the bank selector controls electronic connections among actuators of the modulating elements and selects the actuators that will be responsive.

9. The method of claim 6, wherein the second set of modulating elements includes none of the modulating elements of the first set of modulating elements.

10. The method of claim 6, wherein the second set of modulating elements includes all of the modulating elements of the first set of modulating elements.

11. The method of claim 6, wherein the second set of modulating elements includes at least one of the modulating elements of the first set of modulating elements.

12. The method of claim 6, further including repositioning the 2D array using an adjustable base to position the 2D array to modulate the light using the selected set of modulating elements.

13. The method of claim 6, further including adjusting illumination and relay paths to modulate the light using the selected set of modulating elements.

14. A method of reconfiguring a micro-mechanical light modulator, including:
   using a first set of modulating elements to modulate light impinging on a micro-mechanical light modulator that includes a 2D array of modulating elements with reflecting services organized in multiple rows and columns;
   selecting a second set of modulating elements from the 2D array to be used for modulating the light impinging on the micro-mechanical light modulator;
   using the second set of modulating elements in place of the first set, without replacing the 2D array; and
   relaying the light from the modulating elements through an anamorphic optical path that demagnifies the radiation along one axis of the 2D array to an extent that individual modulating elements in a particular column of the selected set are not resolved at the image plane.

15. The method of claim 14, wherein the demagnified reflecting elements from the particular column are focused on an area about 3 microns wide.

16. The method of claim 14, wherein the demagnified reflecting elements from the particular column are focused on an area less than 10 microns wide.

* * * * *